US012215844B2

(12) United States Patent
Volohovs

(10) Patent No.: US 12,215,844 B2
(45) Date of Patent: Feb. 4, 2025

(54) SYSTEM AND METHODS FOR CONTROLLING LIGHT EMITTING ELEMENTS

(71) Applicant: Dmitrijs Volohovs, Riga (LV)

(72) Inventor: Dmitrijs Volohovs, Riga (LV)

( * ) Notice: Subject to any disclaimer, the term of this patent is extended or adjusted under 35 U.S.C. 154(b) by 0 days.

(21) Appl. No.: 18/439,045

(22) Filed: Feb. 12, 2024

(65) Prior Publication Data

US 2024/0271777 A1 Aug. 15, 2024

(30) Foreign Application Priority Data

Feb. 14, 2023 (DE) ..................... 10 2023 103 500.2

(51) Int. Cl.
*F21V 21/15* (2006.01)

(52) U.S. Cl.
CPC .................................... *F21V 21/15* (2013.01)

(58) Field of Classification Search
CPC .......... F21V 21/15; F21V 21/14; F21V 21/00; F21V 23/00; F21V 23/0442; F21V 23/0464; F21V 23/0471; F21V 14/02
See application file for complete search history.

(56) References Cited

U.S. PATENT DOCUMENTS 10,409,132 B2 * 9/2019 Liu .......................... B60Q 3/80
2021/0289712 A1 * 9/2021 Goettle ..................... F21S 2/00

FOREIGN PATENT DOCUMENTS

EP 3725470 A1 10/2020
WO 2019067783 4/2019

OTHER PUBLICATIONS

Jörg, Feldhusen, and Bungert Frederik. "Pattern Languages: An approach to manage archetypal engineering knowledge." Guidelines for a Decision Support Method Adapted to NPD Processes (2007).

Urquhart, Lewis William Robert, and Andrew Wodehouse. "The emotive qualities of patterns: Insights for design." In DS 87-8 Proceedings of the 21st International Conference on Engineering Design (ICED 17) vol. 8: Human Behaviour in Design, Vancouver, Canada, Aug. 21-25, 2017, pp. 109-118. 2017.

* cited by examiner

*Primary Examiner* — Bao Q Truong
(74) *Attorney, Agent, or Firm* — Smartpat PLC

(57) ABSTRACT

A system includes: a control unit; a pattern visualization device; and a sensor couplable to the control unit. The sensor is configured to sense a parameter of an environment surrounding at least two objects and to provide the sensed parameter to the control unit. The control unit is couplable to the at least two objects and to the pattern visualization device. The control unit is configured to control, based on the sensed parameter, a relative positioning of at least a first one of the at least two objects with respect to at least a second one of the at least two objects. The pattern visualization device comprises means for moving at least one of the objects based on the controlling of the relative positioning by the control unit.

25 Claims, 17 Drawing Sheets

Figure 1a
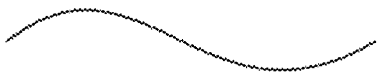
Figure 1b
Figure 1c
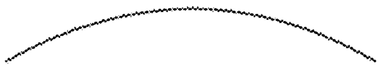
Figure 1d
Figure 1e
Figure 1f
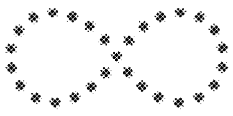
Figure 1g
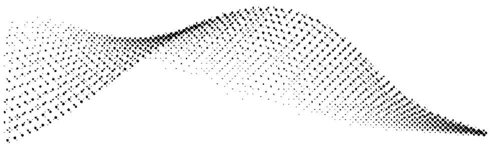
Figure 1h

SYSTEM AND METHODS FOR CONTROLLING LIGHT EMITTING ELEMENTS

CROSS-REFERENCE TO RELATED APPLICATION

This application claims the benefit of German Patent Application DE 10 2023 103 500.2, filed on Feb. 14, 2023, the contents of which is incorporated by reference in its entirety.

TECHNICAL FIELD

The present disclosure generally relates to a system comprising a control unit, and a sensor configured to sense a parameter of an environment surrounding objects. Furthermore, the present disclosure generally relates to a method for controlling a relative positioning of at least two objects, and a method for controlling a positioning of at least one object.

BACKGROUND

It is known that certain visual patterns can affect people emotion and mood. Michael Hann's research underlines that geometry starts with basic points and lines, with lines representing transitions. A 1924 study highlighted that angular lines are seen as "serious" or "hard," while curved lines are perceived as "gentle" or "playful," with emotions influenced by line inflection. This concept is extended in Kansei Engineering, which uses form to evoke emotions. Gestalt theory suggests that slight changes in familiar shapes can create a "sense of happening," altering emotional interpretations of patterns. Additionally, the concept of pattern languages, introduced by Christopher Alexander, uses structured patterns to convey design experiences, emphasizing the role of geometry and pattern in emotional design responses.

It is also known that colors may affect user mood and emotional state. For example, a user may associate the color red with anger, the color pink with love, the color black with sadness and so on.

SUMMARY

Thus, the present disclosure is directed to systems which affect user visual perception to change and/or reflect a mood of a user, and corresponding methods.

A purpose of present disclosure is to create a system which is able to position and illuminate at least one object to reflect and/or create the above-mentioned emotions, wherein the emotion is selected by the user (or determined otherwise, using, for example, artificial intelligence) and/or automatically reflects the mood of the user by the positioning and illumination of at least one object.

The system can be placed in different locations, for example, shops, a private house, a museum, and so on. By showing a certain pattern, created by the position and the illumination of the at least one object, a user mood can be affected, and, as a result, users may be motivated to do different activities.

According to a first aspect, we describe a system comprising: a control unit; a pattern visualization device; and a sensor couplable to the control unit, wherein the sensor is configured to sense a parameter of an environment surrounding at least two objects and to provide the sensed parameter to the control unit; wherein the control unit is couplable to the at least two objects and to the pattern visualization device, and wherein the control unit is configured to control, based on the sensed parameter, a relative positioning of at least a first one of the at least two objects with respect to at least a second one of the at least two objects, and wherein the pattern visualization device comprises means for moving at least one of the objects based on the controlling of the relative positioning by the control unit.

Controlling the relative positioning of at least a first one of the objects with respect to at least a second one of the objects may comprise changing the absolute position of the first one of the objects, changing the absolute position of the second one of the objects, or changing the absolute positions of both of the first one of the objects and the second one of the objects.

The control unit may be any suitable control unit, preferably comprising a processor (and, in some examples, a memory). In some examples, the control unit may be a physical entity. In some examples, the control unit, i.e. the processor (and, in some examples, the memory), may be located in the cloud, and accessed via cloud storage, or cloud computing. The skilled person understands that cloud storage is a model of networked online storage and cloud computing is Internet-based development and use of computer technology stored on servers rather than client computers. In some examples, the control unit may be split between a physical entity and the cloud.

The pattern visualization device may be any suitable device configured to store data and/or execute instructions relating to the physical positioning of at least one of the objects and/or the relative positioning of the objects and/or the relative positioning of the objects with respect to one another. Additionally or alternatively, the pattern visualization device may comprise a drive unit, which comprises control and power electronics configured to drive a plurality of mechanical units which in turn allows for the physical movement of the objects. The skilled person understands that instead of a drive unit, described previously, the pattern visualization device can comprise any means that allows for at least one of the objects to be moved and/or allows for the relative positioning of the objects to be altered. The moving means may comprise one or more of a drive unit, a linear actuator, a winch, a servo actuator, a rotating means or any other suitable moving means, wherein the moving means allows for at least one of the objects to be moved based on the controlling of the relative positioning by the control unit. Any of the above moving means may be comprised in or constitute a moving unit.

The sensor may be any suitable sensor configured to sense a parameter of the environment surrounding the at least two objects. More information on such sensors is given below.

The control unit is configured to control a relative positioning between at least a first object and at least a second object based on the sensed parameter. That is to say, the control unit may control a physical positioning of at least one of the objects so that they move towards/away from each other (in particular in any direction). This movement may be completed by a drive unit, a winch, a linear actuator, a servo actuator, a rotating means or any other suitable method or any combination thereof, wherein the unit that allows for the objects to be moved towards/away from each other is coupled to at least one of the objects, and the control unit.

Throughout the present disclosure, illumination of an object may, in some examples, relate to shining light onto the object (which is then reflected or scattered by the object) and/or the object itself being a light emitting element configured to emit light.

In some examples, the sensed parameter relates to one or more of: a presence and/or movement of a person within the environment surrounding at least one of the at least two objects; a pose and/or gesture of the person in the environment surrounding at least one of the at least two objects; and a sound in the environment surrounding at least one of the at least two objects. The extent of the term "surrounding" may be limited by a capability of the sensor sensing the sensed parameter, i.e. the range of the sensor and/or may be a predetermined distance such as, for example, 1 meter, 2 meters, 3 meters, 4 meters, 5 meters, 6 meters, 7 meters, 8 meters, 9 meters, 10 meters, or any other suitable distance.

That is to say, the sensed parameter may be sensed, for example, via an optical sensor, wherein the optical sensor can sense a presence and/or movement and/or pose and/or gesture of a person, a motion sensor configured to detect a motion of a person, or an audio sensor configured to detect sound, or any combination of the foregoing examples. The audio sensor may detect volume and/or may pick up keywords relating to an emotion and/or mood of a person in the environment of the at least two objects. Any of these sensors may allow for a more accurate determination of the mood and/or emotion of a person, thereby allowing the system to more accurately position the objects in accordance with the mood and/or emotion of the person. The mood of a person may be any suitable and/or recognizable mood such as, for example, happiness, sadness, anger, peacefulness, scared, embarrassment, playfulness, confidence, and so on.

Throughout the present disclosure, it is to be understood that the terms "user" and "person" are interchangeable with each other. Furthermore, when the term "user" or "person" is used, it is to be understood that the same terms may apply to a plurality of users or people. Additionally, when the term "mood" is used, it is to be understood that this is interchangeable with the term "emotion", and vice versa.

In some examples, the sound in the environment is a vocal expression of the person in the environment surrounding at least one of the at least two objects and/or a genre of music in the environment surrounding at least one of the at least two objects. In the case of a vocal expression, keywords showing anger, happiness or sadness, and additionally or alternatively a volume of the vocal expression, may be sensed and correlated to a mood pattern. In the case of a genre of music, the genre of music sensed may be correlated to a mood pattern. In both cases, this may allow for a more accurate determination of the mood and/or emotion of a person, thereby allowing the system to more accurately position the objects in accordance with the mood and/or emotion of the person.

In some examples, the sensed parameter relates to one or more of: an ambient light level in the environment surrounding at least one of the at least two objects; and a facial expression of the person in the environment surrounding the at least one of the at least two objects.

That is to say, the sensed parameter may be sensed, for example, via an optical sensor an ambient light level, temperature via infrared, or a camera configured to capture body language and/or facial emotions or a temperature sensor such as, for example, a semiconductor, a thermocouple, an infra-red sensor, or a thermal switch. Any of these sensors may allow for a more accurate determination of the mood and/or emotion of a person, thereby allowing the system to more accurately position the objects in accordance with the mood and/or emotion of the person. In some examples, the sensed parameter may further comprise a temperature of the environment surrounding the at least one of the at least two objects using the temperature detecting means mentioned above.

In some examples, the system further comprises a pattern illumination device comprising a light source, and wherein at least one of the at least two objects is illuminatable by the light source. This may mean that the object comprises a reflective surface, and the pattern illumination device, via the light source, illuminates the at least one reflective surface of the object. This may allow light to diffuse through the environment surrounding the at least two objects, thereby creating an atmosphere and/or mood and/or reflecting a mood as is described herein. In some examples, only one of the at least two objects is illuminated and/or illuminatable by the light source. In some examples, where there is a plurality of objects, only a subset of the objects may be illuminated and/or illuminatable by the light source. The light source may be any suitable light source comprising at least one light emitting element. The light source may comprise one or more of a lamp, a light emitting diode (LED), a laser, an OLED, an electro luminescent source, or any other suitable light source In some examples, at least one of the at least two objects comprises a light emitting element configured to emit light. The light emitting element may be any suitable light emitting element and/or a light emitting element comprising a plurality of light emitting elements. The light emitting element may comprise one or more of a lamp, a light emitting diode (LED), a laser, an OLED, an electro luminescent source, or any other suitable light emitting element. This may allow light to be emitted into the environment surrounding the at least two objects, thereby creating an atmosphere and/or mood and/or reflecting a mood as is described herein.

In some examples, at least one of the at least two objects is moveable, upon a controlling of at least one of the at least two objects by the control unit, by a winch and/or a linear actuator and/or a servo actuator and/or a rotating means. A rotating means may allow for an object to be rotated in order to form a mood line, mood pattern, or mood plane as described herein. The above methods of controlling may be located within a mechanical unit. That is to say, the at least two objects may be moveable by a mechanical unit, wherein the mechanical unit comprises a winch and/or a linear actuator and/or a servo actuator and/or a rotating means. This may allow for at least one of the object's physical positioning to be altered, and for a pattern/mood pattern/mood line to be created and/or displayed, as described herein.

In some examples, a geometry defined by respective locations of the at least two objects represents a mood pattern, in particular a mood line, wherein the mood pattern corresponds to a mood of a person within the environment surrounding at least one of the at least two objects, and wherein the control unit is configured to control the relative positioning to generate the mood pattern based on the mood of the person. This may allow for the positioning of the objects to reflect the mood and/or emotion of the person. The mood pattern may be defined as a geometry defined by respective locations of the at least two objects, wherein the geometry is based upon the sensed parameter, and the sensed parameter relates to a mood and/or emotion of the person. The emotion may be determined by, for example laughing or crying, in order for the emotion of the person to be linked to a respective emotion, wherein the laughing or crying, for example, is sensed by an audio sensor and/or an optical sensor, and the sensor is configured to determine the emotion based on the sensed parameter and/or reading. In some examples, the audio sensor may detect volume and/or may pick up keywords relating to an emotion and/or mood. Additionally or alternatively, the optical sensor may be able to recognize a presence and/or movement and/or pose and/or gesture of a person and/or facial expression of a person. The determined emotion may be based on the above readings of the respective sensors.

In particular, in the case of the objects being point or point-like sources, such as a bulb, the mood pattern may be established by the person making virtual connections between, for example, nearest neighbor objects. In the case of the objects being elongated objects, the person may establish the mood pattern by virtually connecting, for example, ends of nearest neighbor objects. In some examples, the objects may be touching, or nearly touching, one another, thereby establishing the mood pattern without the need for the person to make virtual connections. The control unit may control the relative positioning of the at least two objects via the methods mentioned above. This may allow for the person to couple a pattern to a mood.

The term "mood line" may, in some examples, refer to a line, or shape, made between nearest neighbor objects, via the virtual connections, if needed, mentioned above. In some examples, the line may shift, and not be a constant line or shape, in which case, it may be referred to as a mood pattern. However, the term "mood pattern" may also be used for a stationary line, or shape.

Additionally, the term "geometry" may relate to the line, or shape, made by the objects via the touching of objects and/or the virtual connections mentioned above. In some examples, both touching, or nearly touching, and virtual connections may be used in the same mood pattern.

In some examples, the system further comprises a memory configured to store a correspondence table between the mood of the person and the geometry, and wherein the control unit is configured to receive a first signal based on the correspondence table for controlling the relative positioning. The memory may be a physical entity, or located in the cloud. In some examples, the correspondence table may comprise two columns or rows, wherein the first column and/or row comprise(s) information on mood, and the second column and/or row comprise(s) information on the geometry and/or mood pattern. The memory therefore can store information on moods and mood patterns reflected, by, or related to, said mood, and control the objects based on the mood, so that said objects are positioned in the corresponding mood pattern. This may allow for the same mood pattern to be used for the same mood repeatedly, thereby allowing the user to associate a pattern with a mood.

In some examples, the system further comprises a processor coupled to or integral to the control unit, wherein the processor is configured to determine the mood of the person based on the sensed parameter. This may also be in the form of a correspondence table, as mentioned above, with the first column/row comprising the mood and the second column/row comprising the sensed parameter. The processor may be able to intake the sensed parameter(s), and compare it/them to moods. In some examples, there is a separate table for each parameter, and the control unit is configured to control the objects via the most common mood, or via a proportional representation of the moods according to each sensed parameter. In some examples, the control unit may produce a score based on the sensed parameter(s) and base the mood off of this score. In some examples, the sensed parameter is in a third column/row of the table mentioned above with respect to the pattern and the mood. Should this happen, the control unit may relate the sensed parameter(s) to the mood, and then the mood to the pattern, thereby allowing the control unit to control the relative positioning of the objects according to the sensed parameter(s). This may allow for the mood, as sensed by the sensor, to be associated with the mood pattern as seen by the person, and for the person to recognize their current mood, should they be unaware of it.

In some examples, the geometry defining the mood pattern fulfils at one or more discrete points in time one or more of: a straight line according to a first mood; a wave-like line according to a second mood; a zig-zag pattern according to a third mood; a spiral according to a fourth mood; and a round shape according to a fifth mood. This may allow for the mood pattern to be associated with different moods/emotions. In particular, the straight line may be associated with passiveness, aspiration, calmness or satisfaction, the wave-like line with stability, instability, calmness or tenderness, the zig-zag pattern with brutality, dynamisism, excitedness, or nervousness, the spiral pattern with concentration and the round shape with focus. The skilled person understands that the various patterns may be associated with different moods for individual people, and that the above are only examples of moods associated with patterns. This may allow for the person to associate various moods with specific mood patterns.

In some examples, the system further comprises a remote control device configured to receive a first manual input by a person regarding a mood of the person, wherein the remote control device is configured to transmit a second signal to the system, and wherein the control unit is configured to control the relative positioning based on the second signal. This may allow for the person to manually input their current mood, or a desired mood, and for the relative positioning of the objects to be altered based on this manually input mood. This may be useful if the user wishes for the system to display a pattern according to their current mood, in order to maintain said mood, or the person may input a desired mood, opposite to their current one, in order to try and change their mood. This latter option may be particularly helpful if the person wishes to become more calm, or more focused, for example. Thereby, the mood pattern reflects the person's current mood, or reflects a wished mood. In some examples, the remote control device may comprise the sensor couplable to the control unit described herein. The remote control device may comprise a microphone and/or a camera and/or a touchscreen and/or any other suitable feature in order for the said device to act as a sensor as described herein.

In some examples, the remote control device is configured to receive a second manual input by the person, wherein the second manual input relates to a creation of a mood of the person not stored in a memory of the system, and wherein the remote control device is configured to transmit a third signal to a receiver of the system, wherein the control unit is further configured to control, based on the third signal, the relative positioning of at least the first object with respect to at least the second object, and wherein the memory of the system is configured to store the created mood and relate said created mood to the sensed parameter. This may allow for the person to create a mood not stored by the memory, and a mood pattern to be associated with this mood. Additionally, in order for the control unit to recognize this new mood, the control unit may take account of the sensed parameter(s) at the point of creation, and store this/these parameter(s) so that when this/these parameter(s) is/are sensed again, the control unit controls the relative position of the objects based on this/these parameter(s). This may allow for the person to customize the moods recognized by the control unit. In some examples, the creation of the mood can be in addition to the first manual input mentioned above, or could be an alternate to the first manual input. That is to say, in some examples, the system may only be able to recognize the second manual input.

In some examples, the remote control device is configured to receive a third manual input by the person, wherein the third manual input relates to the relative positioning of at least the first one of the objects with respect to at least the second one of the objects not stored in the memory of the system, and wherein the remote control device is configured to transmit a fourth signal to the receiver of the system, wherein the control unit is further configured to control, based on the fourth signal, the relative positioning of at least the first one of the objects with respect to at least the second one of the objects, and wherein the memory of the system is configured to store the relative positioning and relate said relative positioning to the sensed parameter. This may allow for the person to create a mood pattern and/or relative positioning of objects not stored by the memory. Additionally, in order for the control unit to recognize this new mood pattern, the control unit may take account of the sensed parameter(s) at the point of creation, and store this/these parameter(s) so that when this/these parameter(s) is/are sensed again, the control unit controls the relative position of the objects based on this/these parameter(s). This may allow for the person to customize the mood patterns and/or relative positioning of the objects. In some examples, the creation of the mood pattern can be in addition to the first and/or second manual input mentioned above, or could be an alternate to the first and/or second manual input. That is to say, in some examples, the system may only be able to recognize the third manual input, only two of the first to third manual inputs, or all three manual inputs.

In some examples, the control unit comprises a machine learning unit comprising a machine learning algorithm, and wherein the machine learning algorithm is configured to determine, based on the sensed parameter, the mood of the person. The machine learning unit may, in some examples, be in communication with a voice recognition service such as, for example, Amazon Voice Services, Microsoft Cortana, Google Assistant or the like, and receive leaning inputs relating to sound from such services. The machine learning unit may, in some examples, be configured to determine, based on the sensed parameter(s), the mood of the person. The machine learning unit may be able to do so via the sensors and/or sensors parameter(s) mentioned above. That is to say, the optical sensor may be able to recognize a presence and/or movement and/or pose and/or gesture of a person and/or facial expression of a person, and determine the mood based on the presence and/or movement and/or pose and/or gesture. The machine learning unit may additionally or alternatively be able to do the same via body language, as seen by the optical sensor, recognition of keywords showing anger, happiness or sadness via the audio sensor (happiness or sadness being recognized via, for example, laughing or crying, in order for the emotion to be linked to the respective emotion), or any other suitable sensed parameter, or any combination of the foregoing examples. In some examples, the machine learning unit is a physical entity, or in the cloud, or a hybrid between the two. The machine learning unit may be trained via a known method, such as, for example, having videos and/or images and/or sounds input into the unit relating to different moods and/or emotions (an image may relate to a facial expression, for example, a person smiling, which may correspond to happiness, a person crying, which may correspond to sadness, and so on), and then training the machine learning unit based on these videos and/or images and/or sounds. Additionally or alternatively, any suitable media may be input into/output from the machine learning unit in order to train said unit and/or the machine learning unit may be trained by any suitable method.

In some examples, the machine learning algorithm is configured to receive updates from an external source via a wired and/or wireless source, and wherein the machine learning algorithm is configured to be altered based on an approval or disapproval by the person of the determination of the mood of the person. This may allow for the algorithm to be updated during use of the system, thereby more accurately determining the mood of the person and so, displaying more accurate and relevant mood patterns. In some examples, the control unit, and the memory in particular, may have several mood patterns for each mood, and may display one of these patterns according to a determined and/or selected mood. The person may then be able to manually input an approval, or disapproval, of the mood pattern via a remote control device, and so, the control unit may control the relative positioning to the next stored pattern and/or relative positioning. The control unit and/or machine learning unit may then store this choice and use the rejected pattern less frequently, and the approved pattern more frequently. This may allow for the displayed patterns to be closer to the mood of the person.

In some examples, a memory of the system comprises a first folder relating to the environment surrounding at least one of the at least two objects, wherein the first folder comprises information on one or more of: a physical positioning of at least one of the objects; historical information on the relative positioning of at least the first object with respect to at least the second object; a purpose of the environment surrounding at least one of the at least two objects; information on a person in the environment surrounding at least one of the at least two objects; and a mood of the person in the environment surrounding at least one of the at least two objects. The physical positioning of the objects may relate to a relative positioning of the objects, a geometric configuration of the objects and an ID of the system, which is used for communication and identification purposes. This may allow for the system to be identified, and for the system to understand the present relative positioning of the objects. The historical information may relate to previous relative positionings, previous mood patterns, previous mood lines, previous moods, and the like. This may then be used to determine future actions of the system based on, for example, the feedback process mentioned above. The purpose may relate to information about the environment where system is setup such as, for example, a store, and the purpose of the store like a bookstore, a clothing store, a jewelry store and the like, a museum, be it a museum with ancient artifacts or modern pieces, or a house, with the information relating to a kitchen, a living room, a bedroom or the like. This may allow for the relative positioning and mood patterns to be altered based on the location of the light source. The information on the person may relate to cultural and religious information or age information, thereby customizing the system to the user. The mood of the person may relate to the present mood of the person, thereby allowing for the relative positioning of the objects to be customized to the person's mood. In some examples, the information on the environment relates to only one of the objects, but it is to be understood that this may apply to any subject of objects within the system.

In some examples, if the first folder comprises information on the mood of the person, the first folder comprises a subfolder comprising a playlist relating to the mood, wherein the playlist comprises (i) a pattern of at least a first and a second relative positioning of at least the first one of the objects with respect to at least the second one of the objects, wherein the first and second relative positionings are different relative positionings, and (ii) music playable from a speaker couplable to the system. This may allow for the system to customize the person's experience based on their present mood. Indeed, the relative positioning of the objects may be altered based on the mood, wherein the relative positionings are changed in a cyclical pattern. This pattern may be part of the mood pattern mentioned herein. The music also may be related to the mood. For example, if the user is in a focused mood, the music may be natural sounds such as sea waves, waterfall, or forest sounds and if the user is in a happy mood, the music may be a list of their favorite songs which have been saved to the memory via a music streaming service, or via a transferred playlist. This may allow for the person to have an immersed experience and amplify their present mood.

In some examples, the control unit is further configured to control one or more of: a wavelength of light emittable by at least one of the at least two objects; an intensity of at least one of the at least two objects; a first pattern comprising at least a first and a second relative positioning of at least the first one of the objects with respect to at least the second one of the objects, wherein the first and second relative positionings are different relative positionings; a second pattern comprising at least a first and a second wavelength of light emittable by at least one of the at least two objects, wherein the first and second wavelengths are different wavelengths; and a third pattern comprising at least a first and a second intensity of at least one of the at least two objects, wherein the first and second intensities are different intensities. The wavelength of light may be altered based on the relative positioning of the objects and/or the mood pattern and/or the mood of the person. For example, red may be associated with anger, the color pink with love and the color black with sadness. In some examples, the intensity of the light may be altered. That is to say, if the room is dark, at least one of the at least two objects may be lowered to, for example, 20% intensity, but if the room is bright, at least one of the at least two objects may be at 100% intensity. Additionally, both the wavelength of light and the intensity of light, along with the relative positionings of the objects, may be altered in cyclical patterns. This may allow for the mood of the person to be more accurately reflected by the system. This may also allow the control unit to more accurately control at least one of the at least two objects according to the relative positioning and/or the mood of the person. In some examples, the wavelength of light emittable by the light source is only in the visible spectrum. In some examples, the controlling relates to only one of the objects, but it is to be understood that this may apply to any subject of objects within the system.

In some examples, if the control unit is further configured to control the first pattern, a memory of the system comprises a second folder, the second folder comprising information on one or more of: a name relating to the first pattern; a description of the first pattern; an association made, by a person, between an experience by the person and the first pattern; a mood associated with the first pattern; an emotion associated with the first pattern; a musical genre associated with the first pattern; and coordinates of at least a first position and a second position in which at least one of the objects is moved between during the first pattern. The name of the first pattern may relate to the pattern of relative positionings such as, for example, "low amplitude 3-peak wave". In this pattern, the relative positionings may be controlled so that it appears that the mood pattern and/or relative positionings replicate a series of rolling waves. The description of the pattern may relate to a more detailed description such as, for example, "a wavy line having 3 peaks, where relation between amplitude and wavelength is less than a value x. Higher value x, shorter wavelength and higher amplitude". This may allow for a programmer and/or a person using the system to more accurately visualize what a pattern looks like. The association between an experience and the first pattern may relate to terms such as "calm sea", "light breeze", "lightweight clouds", "travel" and "vacations". This may allow for the person to add more abstract filters to the first pattern while the control unit and/or the machine learning unit is determining/selecting the mood of the person. Additionally, this may allow for the person to sync their calendar to the system, and if a vacation is approaching, the system may be more likely to display patterns with the tag word "vacation". Moods may be, for example, "relaxed" or "romantic". Emotions may be emotions such as "pleasure" or "tranquility". Both the moods and the emotions may allow for the control unit to more accurately control the objects according to the person's current emotional state. Additionally, when referring to the first to third manual inputs above, the person may input emotions rather than moods. The musical genre may relate to "slow romantic" or "instrumental" dependent on the mood of the person and/or the first pattern. The positioning of the objects may relate to coordinates of each point, which then form a pattern. This may also allow the control unit to calculate how far each object needs to be moved in order to create the pattern. In some examples, if the object is an elongated object, the coordinate may relate to a center point of the object, and may also comprise a rotational angle component, so that the control unit can calculate how far the elongated object needs to be rotated in order to achieve a desired pattern.

According to a second aspect, we describe a method performed by a system for controlling a relative positioning of at least a first object with respect to at least a second object, the method comprising: receiving, by a receiver of the system, optical data and/or sound data relating to an environment surrounding at least one of the objects; determining, by a machine learning unit coupled to the receiver, a mood of the environment, in particular of a person within the environment, surrounding the light source based on the received optical data and/or sound data; and based on the determined mood, controlling, by a control unit of the system, the control unit being couplable to (i) the machine learning unit and (ii) at least one of the objects, the relative positioning of at least the first one of the objects with respect to at least the second one of the objects.

The above method may allow for the receipt of data, similar to the sensors and parameters mentioned above in relation to the first aspect, and the determining, via a machine learning unit similar to the machine learning unit mentioned above, the mood of the environment based on the received data. Then, based on the determined mood, a control unit of the system is configured to control a relative positioning of at least a first one of the objects with respect to at least a second one of the objects. This may allow for the relative positioning of the objects to be altered based on the detected mood. In this aspect, a mood of the environment is determined. This may require the determining of the mood of a plurality of people. In this example, similar to the correspondence tables mentioned above, the machine learning unit may base the relative positioning of the objects based on the most commonly detected mood in the environment, or via a proportional representation of the detected moods of people in the environment. Therefore, the effect is that the relative positioning is based on the mood of the environment.

According to a third aspect, we describe a method for controlling a plurality of objects, the method comprising: providing a single machine learning unit which is coupled to each of objects, wherein the machine learning unit is configured to determine the mood of the environment; and performing the method of the second aspect for each of the objects. This may allow for more elaborate relative positionings and mood patterns as the number of objects are increased. In this case, the control unit of the system may comprise a main controller configured to control a plurality of the objects simultaneously.

According to a fourth aspect, we describe a method performed by a system for controlling a pattern comprising at least a first object and a second object, wherein the first object is coupled to a first subsystem and the second object is coupled to a second subsystem, the method comprising: moving, via a control unit coupled to the first subsystem and the first object, the first object to a first physical position; moving, via the control unit coupled to the second subsystem and the second object, the second object to a second physical position; selecting, by the control unit, a transformation algorithm, wherein the transformation algorithm results in a third physical position of the first object and a fourth physical position of the second object, is the algorithm being generated from the first and second physical positions of the respective objects; starting, by the control unit, the transformation; and stopping, by the control unit, the transformation when the physical position of the first object matches the third physical position and the physical position of the second object matches the fourth physical position.

This may allow for the third position and the fourth position to be a blend between the first and second positions. This may be particularly helpful in situations where there are many people in the environment, and the control unit/machine learning unit controls the relative positioning of the objects according to a proportional determination of moods of people within the environment.

Throughout the present disclosure, the term "visualize" may refer to the movement of at least one of the objects, by a control unit.

In some examples, the control unit is further configured to select a transformation time, wherein the transformation time is the time needed for the first object to be controlled between the first physical position and the third physical position, and the second object to be controlled between the second physical position and the fourth physical position. This may allow for the third and fourth physical positions to be reached simultaneously, thereby creating a more aesthetically pleasing pattern movement.

According to a fifth aspect, we describe a method for controlling a plurality of objects, the method comprising: providing a single control unit which is coupled to each of the objects, wherein the control unit is configured to control a positioning of at least a first object; and performing the method of claim 18 for each of the objects. This may allow for more elaborate relative positionings and mood patterns as the number of objects is increased. In this case, the control unit of the system may comprise a main controller configured to control a plurality of the objects simultaneously.

According to a particular non-limiting example of the present disclosure, patterns and/or mood patterns and/or mood lines may be created using the objects mentioned herein. In a particular example, there may be 13 objects placed in a line, with the pattern and/or mood pattern and/or mood line being formed, either by touching objects or by the virtual connections mentioned herein, being formed by the line of objects.

Any advantages and features described in relation to any of the above aspects and examples may be realized in any of the other aspects and examples described above.

It is clear to a person skilled in the art that certain features of the system set forth herein may be implemented under use of hardware (circuits), software means, or a combination thereof. The software means can be related to programmed microprocessors or a general computer, an ASIC (Application Specific Integrated Circuit) and/or DSPs (Digital Signal Processors). For example, a processing unit may be implemented at least partially as a computer, a logical circuit, an FPGA (Field Programmable Gate Array), a processor (for example, a microprocessor, microcontroller (μC) or an array processor)/a core/a CPU (Central Processing Unit), an FPU (Floating Point Unit), NPU (Numeric Processing Unit), an ALU (Arithmetic Logical Unit), a Coprocessor (further microprocessor for supporting a main processor (CPU)), a GPGPU (General Purpose Computation on Graphics Processing Unit), a multi-core processor (for parallel computing, such as simultaneously performing arithmetic operations on multiple main processor(s) and/or graphical processor(s)) or a DSP.

Even if some of the aspects described above have been described in reference to any one of the first to fifth aspects, these aspects may also apply to any one or more of the other aspects.

BRIEF DESCRIPTION OF THE DRAWINGS

These and other aspects of the invention will now be further described, by way of example only, with reference to the accompanying figures, wherein like reference numerals refer to like parts, and in which:

FIGS. 1*a-h* show illustrations of positioning of objects according to some example implementations as described herein;

DETAILED DESCRIPTION

Figure 2:
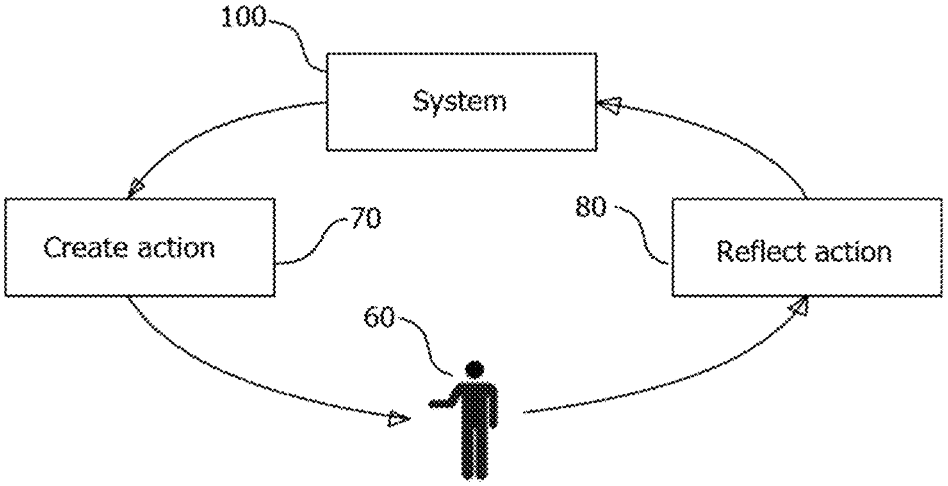
FIG. 2 shows a flow chart of the creation, and reflection, of moods according to some example implementations as described herein.

FIG. 1 shows illustrations of positioning of objects according to some example implementations as described herein.

A control unit of the system mentioned herein may be any suitable control unit, preferably comprising a processor and a memory. In some examples, the control unit may be a physical entity. In some examples, the control unit, i.e. the processor and/or the memory, may be located in the cloud, and accessed via cloud storage, or cloud computing. The skilled person understands that cloud storage is a model of networked online storage and cloud computing is Internet-based development and use of computer technology stored on servers rather than client computers. In some examples, the control unit may be split between a physical entity and the cloud (in particular the processor or the memory may be stored in the cloud). More details are given on such a control unit below.

The system also comprises a pattern visualization device, which may be any suitable device configured to store data and/or execute instructions relating to the physical positioning of at least one of the objects and/or the relative positioning of the objects. Additionally or alternatively, the pattern visualization device may comprise a drive unit, which comprises control and power electronics configured to drive a plurality of mechanical units which in turn allows for the physical movement of the objects The system further comprises a sensor which may be any suitable sensor configured to sense a parameter (or parameters) of the environment surrounding the light source. More information on such sensors is given below.

The control unit is configured to control a relative positioning between at least an object and at least a second object based on the sensed parameter. That is to say, the control unit may control a physical positioning of at least one of the objects so that they move towards/away (in any direction) from each other. This movement may be completed by a drive unit, a winch, a linear actuator, a servo actuator, a rotating means or any other suitable method, wherein the unit that allows for objects to be moved towards/away from each other is coupled to at least one of the objects and the control unit.

Any pattern can be represented by individual object, via the above-mentioned relative positioning, for example, a straight line of FIG. 1*a*, which may be represented by an elongated object, can be a dotted line as shown at FIG. 1*e*, where the objects are "point sources" such as, for example, lamps and bulbs. The term "point source" may be interpreted to mean an object where the light is primarily emitting/diffusing from a point, or small area, such as seen in a bulb, plastic or glass spheres, crystals, pendants, sticks and the like.

In some examples of elongated objects, the elongated objects are, at least partially, flexible. This may allow for mood patterns and mood lines, as seen in FIGS. 1*b*, 1*c* and 1*d* to be displayed.

A geometry defined by respective locations of the objects represents a mood pattern, in particular a mood line, wherein the mood pattern corresponds to a mood of a person within the environment surrounding the objects, and wherein the control unit is configured to control the relative positioning to generate the mood pattern based on the mood of the person. This may allow for the positioning of the objects to reflect the mood and/or emotion of the person.

The term "mood line" may, in any one or more of the examples outlined throughout the present disclosure, refer to a line, or shape, made between nearest neighbor objects, via the virtual connections, if needed, mentioned above. In some examples, the line may shift, and not be a constant line or shape, in which case, it may be referred to as a mood pattern. However, the term "mood pattern" may also be used for a stationary line, or shape.

Additionally, the term "geometry" may relate to the line, or shape, made by the objects via the touching of elements and/or the virtual connections mentioned above. In some examples, both touching, or nearly touching, and virtual connections may be used in the same mood pattern.

The mood pattern may also be constructed from a series of elongated objects, as seen in FIG. 1*f*.

More complicated mood patterns may be constructed from a plurality of objects, as seen in FIGS. 1*g* and 1*h*. In this case, the mood pattern may be established by the person making virtual connections between nearest neighbor objects. In the case of the objects being elongated objects, the person may establish the mood pattern by virtually connecting ends of nearest neighbor objects. In some examples, the objects may be touching, or nearly touching, one another, thereby establishing the mood pattern without the need for the person to make virtual connections.

In the case of FIG. 1*h*, more complicated mood patterns may occupy a three-dimensional space and may be constructed from a plurality of objects, virtual lines, virtual connections, or other shapes. As seen in FIG. 1*h*, several mood lines may form a plane in 3D space. Alternatively, the mood lines may be the plane, and be referred to as a "mood plane". The formation of a mood plane follows the formation of the mood lines and mood patterns described herein. In this case, again, the mood pattern may be established by the person making virtual connections between nearest neighbor objects.

Mood patterns can be approximated, i.e. may relate to an abstract pattern, or the control unit may control the relative positioning so that such mood patterns can be realized by the system and/or the person, scaled up or down to any number of "point source" and/or elongated objects, depending on the system configuration and/or the wants and needs of the person.

It is also known that colors may affect user mood and emotional state. For example, red may be associated with anger, the color pink with love and the color black with sadness. Therefore, the objects devices may be additionally configured to emit a plurality of wavelengths of light across at least the visible spectrum. This may allow for the system to display multiple colors of light simultaneously and for the system to accurately reflect the mood of a person in the environment of the light source, in line with the sensed parameter(s), as will be described in more detail below.

The objects may emit light via at least one of the two following methods:

In some examples, the system further comprises a pattern illumination device (shown in FIG. 4*b*) comprising a light source, and wherein at least one of the at least two objects is illuminatable by the light source. This may mean that the object comprises a reflective surface, and the pattern illumination device, via the light source, illuminates the at least one reflective surface of the object. In some examples, the surface may not be reflective. This may allow light to diffuse through the environment surrounding the at least two objects, thereby creating an atmosphere and/or mood and/or reflecting a mood as is described herein. In some examples, only one of the at least two objects is illuminated and/or illuminatable by the light source. In some examples, where there is a plurality of objects, only a subset of the objects may be illuminated and/or illuminatable by the light source. The light source may be any suitable light source comprising at least one light emitting element. The light source may comprise one or more of a lamp, a light emitting diode (LED), a laser, an OLED, an electro luminescent source, or any other suitable light source.

Figure 4A:
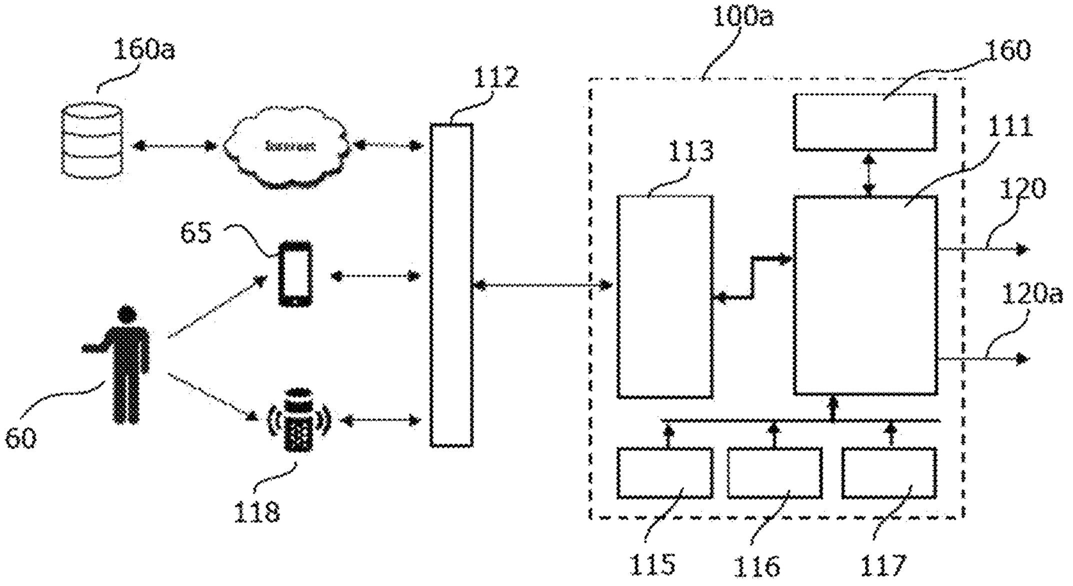
FIG. 4*a* shows a block diagram of a first part of the system according to some example implementations as described herein.
Figure 4B:
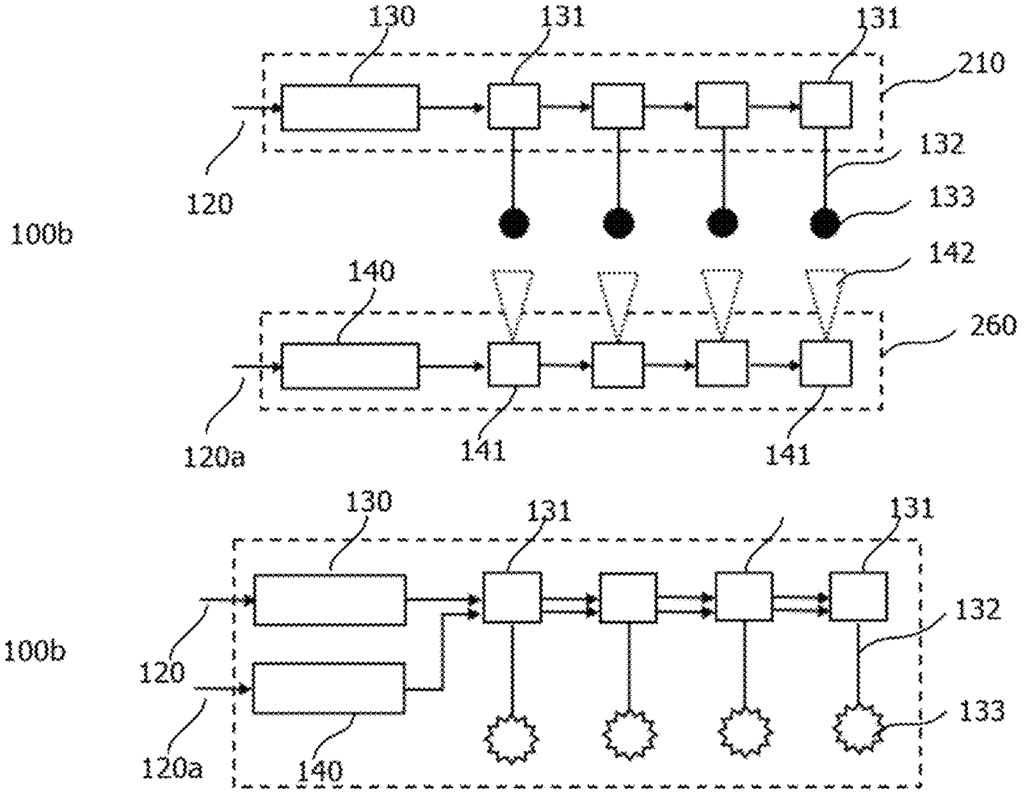
FIG. 4*b* shows a block diagram of a second part of the system according to some example implementations as described herein.

In some examples, at least one of the at least two objects comprises a light emitting element configured to emit light (shown in FIG. 4*b*). The light emitting element may be any suitable light emitting element and/or a light emitting element comprising a plurality of light emitting elements. The light emitting element may comprise one or more of a lamp, a light emitting diode (LED), a laser, an OLED, an electro luminescent source, or any other suitable light emitting element. This may allow light to be emitted the environment surrounding the at least two objects, thereby creating an atmosphere and/or mood and/or reflecting a mood as is described herein.

FIG. 2 shows a flow chart of the creation, and reflection, of moods according to some example implementations as described herein.

The system 100 described herein may have two primary abilities when it comes to the relative positioning of the objects, and the objects themselves, displaying the mood of the person 60 in the environment surrounding the light source.

The first primary ability is to reflect an action 80, i.e. reflect the person's mood, by displaying appropriate mood patterns to the person 60.

The second is to create an action 70, i.e. create a mood, via a user defined mood by displaying appropriate mood patterns to the person 60.

As can be seen in FIG. 2, this may create a feedback loop where the system 100 displays the mood of the person 60 which is fed back into the system 100, the person 60 then sees the display and creates an action 70 which is then fed back into the system 100. In some examples, there may not be a create action 70 or reflect action 80 block in this feedback system.

In some examples, the create action 70 block may relate to the person's current mood, in order to maintain said mood, or a desired mood, opposite to the person's current mood, in order to try and change their mood. This latter option may be particularly helpful if the person 60 wishes to become more calm, or more focused, for example. Thereby, the mood pattern reflects the person's current mood, or reflects a wished mood.

Figure 3:
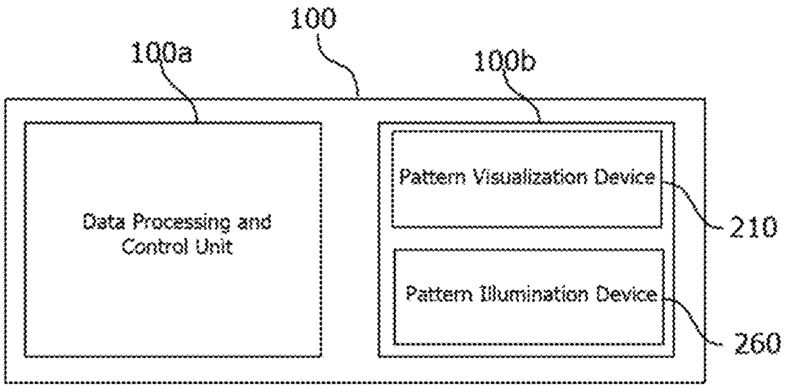
FIG. 3 shows a block diagram of a system according to some example implementations as described herein.

FIG. 3 shows a block diagram of a system according to some example implementations as described herein.

The system 100 comprises in this example two main parts:

The Data Processing and Control Unit 100*a* comprises elements which will be described in more detail below.

The other main part 100*b* of the system 100, described as the Pattern and Illumination Unit 100*b*, comprises a Pattern Visualization Device 210 and Pattern Illumination Device 260. The Pattern Illumination Device 260 may be an optional part of the system 100.

The skilled person understands that any suitable part of the system 100 may be located in the cloud, and accessed via cloud storage, or cloud computing. The skilled person understands that cloud storage is a model of networked online storage and cloud computing is Internet-based development and use of computer technology stored on servers rather than client computers. In some examples, the control unit may be split between a physical entity and the cloud. Additionally or alternatively, any suitable element of the system 100 may be located in a plurality of different physical locations and/or different elements of the system 100 may be located in a plurality of different physical locations.

FIG. 4*a* shows a block diagram of a first part of the system according to some example implementations as described herein.

The Data Processing and Control Unit 100*a* comprises the following features:

CPU Unit 111;
Data Storage 160;
Communication Unit 113;
Sensors 115, 116, 117;
Data Lines 120 and 120*a*.

The Data Processing and Control Unit 100*a* is connected to a Network 112 via a communication unit 113, wherein the connection is by wire and/or wireless. The communication unit 113 may be a transmitter, a receiver, a transceiver, or any other suitable means. The Network 112 is preferably the Internet, but may be a private network not connected to the cloud, such as, for example, a home intranet network or a work intranet network.

The Data Processing and Control Unit 100*a* may also be coupled to external devices, such as a Home Assistance Device 118 such as, for example, Amazon Alexa, Google Assistant or Microsoft Cortana, and/or a Mobile Device 65 such as, for example, a mobile phone or a remote control, via the Network 112.

The Data Processing and Control Unit 100*a* may also be connected to remote storage 160 via the Internet, wherein the remote storage is located at a different physical location from the Data Processing and Control Unit 100*a* and/or is in the cloud.

The CPU Unit 111 may optionally have an AI Engine, in form of a hardware unit such as, for example, an Edge AI chipset, or software, which uses the communication unit 113 to send information to a remote AI processing and interpretation unit. Cloud based AI services such as, for example, the OpenAI neural network service can be used as remote AI processing. The AI engine may be referred to as the machine learning unit herein. The machine learning unit may comprise a machine learning algorithm configured to determine, based on the sensed parameter(s), the mood of the person. The parameter(s) is/are described in more detail below.

The machine learning unit may, in some examples, be configured to determine, based on the sensed parameter(s), the mood of the person. The machine learning unit may be able to do so via the sensors and/or sensors parameters mentioned herein. In some examples, the machine learning unit is a physical entity, or in the cloud, or a hybrid between the two.

In some examples, the machine learning algorithm is configured to receive updates from an external source via a wired and/or wireless source, and wherein the machine learning algorithm is configured to be altered based on an approval or disapproval by the person of the determination of the mood of the person. This may allow for the algorithm to be updated during use of the system, thereby more accurately determining the mood of the person and so, displaying more accurate, and relevant, mood patterns. In some examples, the control unit, and the memory in particular, may have several mood patterns for each mood, and may display one of these patterns according to a determined and/or selected mood. The person may then be able to manually input an approval, or disapproval, of the mood pattern via a remote control device, and so, the control unit may control the relative positioning to the next stored pattern and/or relative positioning. The control unit and/or machine learning unit may then store this choice and use the rejected pattern less frequently, and the approved pattern more frequently. This may allow for the displayed patterns to be closer to the mood of the person. In some examples, the machine learning unit may be in communication with a voice recognition service such as, for example, Amazon Voice Services, Microsoft Cortana, Google Assistant or the like, and receive learning inputs relating to sound from such services.

The sensors 115, 116, 117 are configured to sense a parameter (or parameters) of the environment surrounding the system 100 and can comprise one or more of:

- an ambient light sensor to detect an illumination level of the environment where the system 100 is located;
- a temperature sensor to detect a temperature of the environment where system the 100 is located;
- a motion detection PIR sensor to detect movement or human presence;
- an image sensor to receive video frames of user, for example, pose, gesture, face emotions, movement etc.; and
- an audio sensor to analyze and listen to user(s) sounds as well as a sound from space where the system is located.

Any number of the above sensors 115, 116, 117 may be used in conjunction with the system. That is to say, the sensed parameter(s) may be sensed via an optical sensor, wherein the optical sensor can sense a presence and/or movement and/or pose and/or gesture of a person 60, a motion sensor configured to detect a motion of a person 60, or an audio sensor configured to detect sound, or any combination of the foregoing examples. The audio sensor may detect volume and/or may pick up keywords relating to an emotion and/or mood of a person 60 in the environment of the light source. Any of these sensors may allow for a more accurate determination of the mood and/or emotion of a person 60, thereby allowing the system 100 to more accurately position the objects in accordance with the mood and/or emotion of the person 60. The machine learning unit may be able to do the same via body language, as seen by the optical sensor, recognition of keywords showing anger, happiness or sadness via the audio sensor, or any other suitable sensed parameter(s), or any combination thereof.

Additionally, a wearable device, like a smartwatch, can be considered as a sensor 115, 116, 117. The wearable device may be coupled to the system via a wired and/or wireless connection via the communication unit 113. In this case, the system 100 can receive information about a user physical state, such as the temperature and heart rate of the user 60, and use said data in the interpretation of the user emotional state and mood and so control system settings such as, for example, the relative positioning of the objects in order to display mood patterns.

The following is a particular example of the parameters the sensors 115, 116, 117 may sense. The sensors 115, 116, 117 may sense one or more of the following parameters:

Acoustic data, or sound data, may be an important source of information to determine user mood in an environment. To gather acoustic data, an acoustic sensor 115, such as a microphone, or a home assistant 118 may be used. The user 60 may select the preferred method of sensing sound data during system 100 setup. When the home assistant 118 is in use, it may detect a specific vocal keyword, that is, a "wake" word. For example, a user may say "Alexa" to trigger the home assistant 118 to begin listening.

The system 100 may be connected to the Internet, which, respectively may be connected to one or more cloud servers which host a voice service for interpreting sound data that may comprise voice commands. Cloud processing may use a cloud-based interpreting acoustic data and voice recognition software service, i.e., a voice service, such as Amazon Voice Services, Cortana, Google Assistant, or the like.

The sensor(s) 115, e.g. microphone device(s), may identify acoustic signals, filter them and transmit them to a remote cloud server for additional processing. Acoustic signals may be audio data of interest. For example, acoustic signatures may be all acoustic signals sensed by the microphone device, or may comprise some restrictions, such as acoustic signals which are voice commands specifically intended for processing (e.g., a specific keyword or a wake word), or acoustic signals which fall within or above one or more thresholds (such as a frequency and/or amplitude threshold).

Particularly, some types of information can be obtained from the audio analysis of the environment, which allow for detecting the mood in an environment:

- User-generated sounds such as screams or yells; personal sounds such whistles, claps, snaps; snoring; coughing/sneezing; laughing; etc. Any or all of these user-generated sounds may be used to detect a mood. For example, whispering may indicate a romantic or relaxing mood;
- People presence information such as a number and the type of people present in the environment and/or estimation of gender and age. For example, the presence of a child can be detected, and an "exciting" mood can be selected via the method disclosed herein. In the case of a large group of people being detected, the dominate group of people within this larger group defines the mood. The dominant group may be selected by their loudness and/or frequency of talking, for example;
- Verbal expressions. User may say, for example, "I am bored" and so, the device 118 may then transmit the phrase in a digital form to the cloud server for acoustic processing. The system 100 may then receive interpreted data back from the cloud processing as a text file containing the word "bored" or "boring", which can be used to detect user mood, for example, as a "bored mood";

Music being played may be detected and classified. Music classification and mood detection may be achieved via the aforementioned cloud processing and/or via local processing. The system 100 may then receive a response from the cloud server and/or local processor, and interpret the response to select the appropriate mood. For example, if the music genre is indicated, classical music can be matched to a quiet mood;

Auxiliary sounds such as, for example, sounds from appliances, media, water, cooking, movement, airflow, exterior/outdoor sounds, and pet sounds, among others can be used. For example, a morning alarm clock may power on the system 100 and initiate displaying "wake up" pattern sequence.

Additionally or alternatively to the above, the sensor 115 may transmit the data to the CPU unit 111. The CPU unit 111 may then transmit the data to a cloud processing service on a cloud server for acoustic processing, or the system controller may locally process the sound data, based on the determination of whether the signal is an acoustic signature, i.e. audio data of interest for additional processing. If the device 118 and/or system 100 determines that additional processing is necessary, the sound data may be sent to a server, i.e. a cloud server on the Internet, for additional processing.

Alternatively, the device 118 may transmit acoustic data to the Data Processing and Control Unit 100*a*, and the Data Processing and Control Unit 100*a* may interpret and determine whether the data should remain local or be transferred to the cloud server for cloud processing. Although a cloud server has been described, it is to be understood that any server may be used, for example, a dedicated server and/or a physical server. For example, the system 100 may handle some or all of the acoustic processing in place of, or in addition to, the cloud server.

In order to perform the analysis and classification locally within the system 100, the audio content analysis and classification software, which may run at the Data Processing and Control Unit 100*a*, may execute a feature extraction and audio classification algorithm, which processes an incoming audio signal. With the software, the audio signal may be processed, and characteristic features from the audio content may be extracted, which are then used for classifying the audio content of each audio signal.

The software may execute a two-step analyzing and classification process. In a first step, an audio content may be classified into one of general audio classes and its subclasses such as, for example, people presence, music, verbal expression, control words and auxiliary sounds by extracting and analyzing features from the audio content. The first step allows for the classification of the audio content. Then, in a second step, the software may refine the classification by further extracting and analyzing features from the audio content. For example, the software may further analyze an audio content, classified during the first step as "music class", by doing a more specific analysis to determine whether the audio content is Jazz, Rock, Reggae, Folk, R&B, classic etc. The two-dimensional mood model proposed by Thayer, R. E. (1989), "*The biopsychology of mood and arousal*", (hereinafter, "Thayer") may be also used to detect music mood. The two-dimensional model adopts the theory that mood is comprised of two factors: Stress (happy/anxious) and Energy (calm/energetic), and divides music mood into four divisions: contentment, depression, exuberance and anxious/frantic. Usually, there are four parameters of audio features to detect the music mood: intensity, timbre, pitch and rhythm. These four features correspond to physical quantities such as frequency, duration, amplitude, and spectrum distribution of air vibrations. In the mood map, intensity and timbre are associated with energy while rhythm and pitch are in combination with stress in Thayer's mood model.

Yet another way to detect the music mood is using Bag-of-Words (BOW). BOW is a collection of words where each word is assigned tags from a dictionary. A word can have different tags. Some tags are predefined as positive or negative according to mood, such as happy words, sad words, etc., while other tags are tagged based on previous tags. In an example, the lyrics of a song may be represented as a set of the 20 most frequent words (stems) in the song, then the emotional value may be calculated by the Data Processing and Control Unit 100*a* and/or cloud server based on the positive and negative word counts. Using a speech to text algorithm, may allow for the lyrics of a song to be extracted and analyzed. The classification result is then interpreted, using, for example, a lookup table, where subclass correspond to certain mood: class "music"→sub-class "classic"→sub-class "contentment"→Relaxing Mood. Then, on a result of classification, the moods are matched with patterns and/or colors, and are displayed via the methods described herein.

In some examples, the system 100 may have the ability to have gesture-based control. The gesture-based control software of the system 100 may identify the user 60 and/or gestures performed by user 60 using any device capable of capturing images by the sensor 116 and/or by receiving information from mobile device/remote control device 65.

The gesture-based control software of the system 100 may identify a gesture being indicated by the user 60 based on the images generated by the sensor 116 and/or sensed by the mobile phone/remote control device 65. The gesture may be indicated by the user 60 holding a position for a period of time to indicate a command and/or by the user 60 performing one or more bodily movements that indicate a command.

To engage the gesture-based control software, the user may perform an engage gesture. The engage gesture may be captured by the sensor 116 and may be identified by the gesture-based control software to activate the gesture-based control software. The system 100 may indicate to the user 60 that the gesture-based control software is engaged, by, for example, displaying a selected pattern of objects 133 and/or illuminating the objects 133 with a selected color.

The gesture-based control software may, additionally or alternatively, be activated and/or deactivated by a keyword received and identified by the audio content analysis and classification software, using the sensor 115 described above and/or via another sensor 115, 116, 117. The audio commands may be paired with gestures to display and illuminate a pattern. For example, the user 60 may say "blue wave", and slowly raise and lower their hands. Audio content analysis and classification software may then recognize and select the "wave" pattern, then display said pattern, and illuminate the pattern with a "blue" color. At the same time, the gesture-based control software may detect the rising and lowering hands, classify and interpret the rising hands as a command to increase wave amplitude, and the lowering hands as a decrease of amplitude of the wave pattern.

The above gesture-based control software may be stored in the Data Processing and Control Unit 100*a* and/or the Pattern and Illumination Unit 100*b* and/or in the cloud.

Data storage 160 can be realized as a physical entity, such as, for example, an SSD or any other non-volatile memory device.

The Data Processing and Control Unit 100*a* can be realized using an SBC (single board computer).

The data lines 120, 120*a* may allow for data from the CPU unit 111 to be communicated to an external element/device/unit. The data may relate to the controlling of the objects described herein. In some examples, there is only one data line. In some examples, one of the data lines 120, 120*a* may be used for controlling a physical positioning of at least one of the objects, and the other data line 120, 120*a* may be used for controlling illumination of at least one of the objects. In some examples, at least one of the data lines 120, 120*a* may transmit and/or receive data relating to the physical positioning and the illumination. In some examples, there may be one data line 120, 120*a* (combined data line for illumination and position). In some examples, there may be two data lines 120, 120*a* (one for illumination, one for position).

FIG. 4*b* shows a block diagram of a second part of the system according to some example implementations as described herein.

The Pattern and Illumination Unit 100*b* of system 100 has, in this example, two major parts: The Pattern Visualization Device 210 and the Pattern Illumination Device 260.

The Pattern Visualization Device 210 comprises, in this example, a drive unit 130, which comprises control and power electronics configured to drive a plurality of mechanical units 131. In some examples, there may only be one mechanical unit 131. As can be seen in FIG. 4*b*, the Pattern and Illumination Unit 100*b* receives an input from the data lines 120, 120*a* output from the CPU unit 111 of the Data Processing and Control Unit 100*a*.

The mechanical unit 131 moves an object 133 via a link 132. Each object 133, in this example, corresponds to a dot from FIG. 1*g*, where a pattern is represented by dots. A number of objects 133 forms the dotted pattern. Although dots, corresponding to the "point sources" are mentioned here, it is to be understood that the same principle applies to the elongated objects.

Each of the mechanical units 131 may be a winch, and each of the links 132 may be a rope. Additionally, one or more of the mechanical units 131 may comprise a linear drive device, which couples the object 133 to the mechanical unit 131 and allows for the object 133 to be moved relative to the mechanical unit 131. In some examples, a mechanical unit can comprise a plurality of drive units and/or objects 133. Other forms of mechanical device may be used which are able to locate objects in an environment such as, for example, a servo actuator or a rotating means.

For example, the drive unit 130 may be coupled to the CPU unit 111 via the data lines 120, 120*a*. The CPU unit 111 may be configured to transmit a position of the object 133 to be positioned by the mechanical unit 131 in absolute terms, in relative terms, via coordinates, or via any other suitable method, or any combination thereof. This may allow for the objects to be controlled independently from one another.

The Pattern Illumination Device 260 comprises, in this example, a drive unit 140, which comprises control and power electronics to control a plurality of light units 141. Each light unit 141 is configured to emit a light beam 142, which illuminates an object 133. Thus, the object 133 can be individually illuminated, and a pattern, created by the objects 133 emit, via diffusion or any other suitable means, a certain color of light. Alternatively, there may be only one light unit 141 which illuminates a whole pattern. In some examples, a light unit 141 may be configured to emit a plurality of light beams 142, wherein each light beam 142 can have the same characteristics, or different characteristics such as, for example, an intensity and/or a wavelength of light.

The drive unit 140 may be coupled to the CPU unit 111 via the data lines 120, 120*a*. The CPU unit 111 may be configured to transmit color and/or intensity characteristics to each light unit 141. This may allow for the light units to be controlled independently from one another.

The Pattern and Illumination Unit 100*b* of the system 100 may have a combined Pattern Visualization Device 210 and Pattern Illumination Device 260. In this implementation, the mechanical unit 131 sends power and data to a light source located within a respective object 133 via a respective link 132. This can be implemented by, for example, a winch with an electrically conductive rope or cable.

FIG. 5 shows schematic views of the second part of the system according to some example implementations as described herein.

FIG. 5 shows different placement options of the Pattern and Illumination Unit 100*b*. In this example, the Pattern and Illumination Unit 100*b* is coupled to the ceiling of a room, and the Pattern and Illumination Unit 100*b* is shown as if the person 60 is looking directly up at the Pattern and Illumination Unit 100*b* from the ground. In the case of mechanical units other than winches such as, for example, linear actuators, the Pattern and Illumination Unit 100*b*, or indeed the entire system 100 can be placed on the floor, or even on the wall of a room. In this example, the mechanical units 131 are winches and the mechanical units 131 are not shown for simplicity.

The placement of the Pattern and Illumination Unit 100*b* may also present specific ornamental patterns. For example, it can be a line, wave, matrix, spiral, or a combination of any of these patterns. The placement pattern may reflect a certain style of architecture of environment, for example, modern, gothic, religious and so on. This data may be input by the person 60 into the CPU unit 11 during installation of the system 100 and/or may be input after installation of the system 100 and/or may be predetermined during manufacturing of the system 100. In particular, a matrix pattern may be achieved by having more than one subsystem 100*b*, wherein a plurality of objects 133 are arranged equidistantly.

The system 100 may create patterns, as seen in FIGS. 5*a* to 5*d*, by controlling objects 133 within a space or environment. Additionally or alternatively, an object 133 may comprise flexible or rigid material such as, for example, an LED illuminated line, an electroluminescent belt or rope, a fabric curtain or the like suspended at several links 132. In some examples, the object 133 may be partially or fully flexible.

Figure 5A:
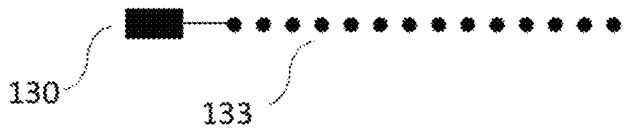
FIGS. 5*a-d* show schematic views of the second part of the system according to some example implementations as described herein.
Figure 5B:
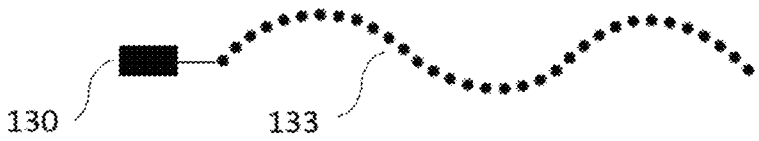

In the examples of FIGS. 5*a* and 5*b*, the arrangement of the mechanical unit(s) 131 can aid the display of various patterns. For example, the pattern shown in FIG. 5*a* may be caused by a line of mechanical units 131, whereas the pattern of FIG. 5*b* may be caused by a curved arrangement of mechanical units 131.

Figure 5C:
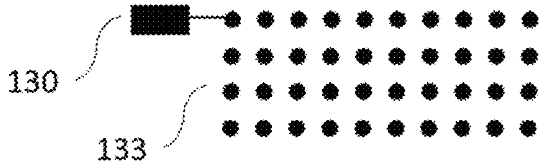

In FIG. 5*c*, there may be a set of arrangements as seen in FIG. 5*a* next to each other in order to cause a matrix/lattice type arrangement.

Throughout the patterns shown in FIG. 5*a* to *d*, a light unit 141, or light units 141, forms the Pattern Illumination Device 260, wherein the Pattern Illumination Device 260 can illuminate one particular object 133, or group of objects 133 via a light beam 142 or light beams 142. In some examples, the object 133 comprises a light emitting element configured to emit light internally from the object 133. This may mean that in some examples, the Pattern Illumination Device 260 is an optional feature. In some examples, the Pattern Illumination Device 260 can be placed away from the objects 133 (above, below, or beside the objects 133), or inside the object 133, thus, the object 133 becomes a light unit 141.

Figure 5D:
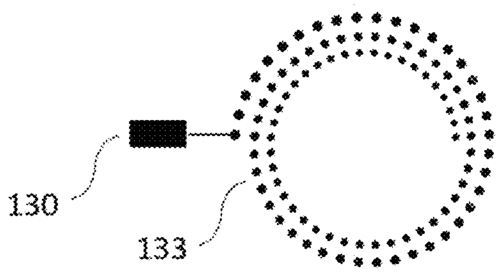

The arrangement of mechanical units 131, i.e. the mechanical units 131 which move the objects 133 may also be in form of certain pattern, such as the wave of FIG. 5*b*, or the spiral of FIG. 5*d*. The arrangement of mechanical units 131 in the form of a pattern can reflect cultural aspects, or other aspects, of the environment. As an example, a treble clef in a concert hall could be used.

The mechanical units 131 may be arranged as needed by an installer or a user 60 to form any desired pattern such as, for example, linear, curved, matrix/lattice, or spiral, as shown in FIG. 5*a* to *d*.

As an example, the mechanical units 131 may be arranged in the form of "infinity" shape "∞", as shown at FIG. 1*g*. If each object 133 is moved up or down, the infinity shape can be played with as desired. If the vertical position of each object 133 is randomly chosen and/or moved in a random pattern, a chaotic up/down movement is seen by the user 60. But, if at one moment all objects 133 are at the same vertical height the original infinity shape is seen by the user. In some examples, the infinity shape can become a slow-moving wave by moving each of the objects 133 up or down according to their position within the "endless line" of the infinity shape.

Figure 6:
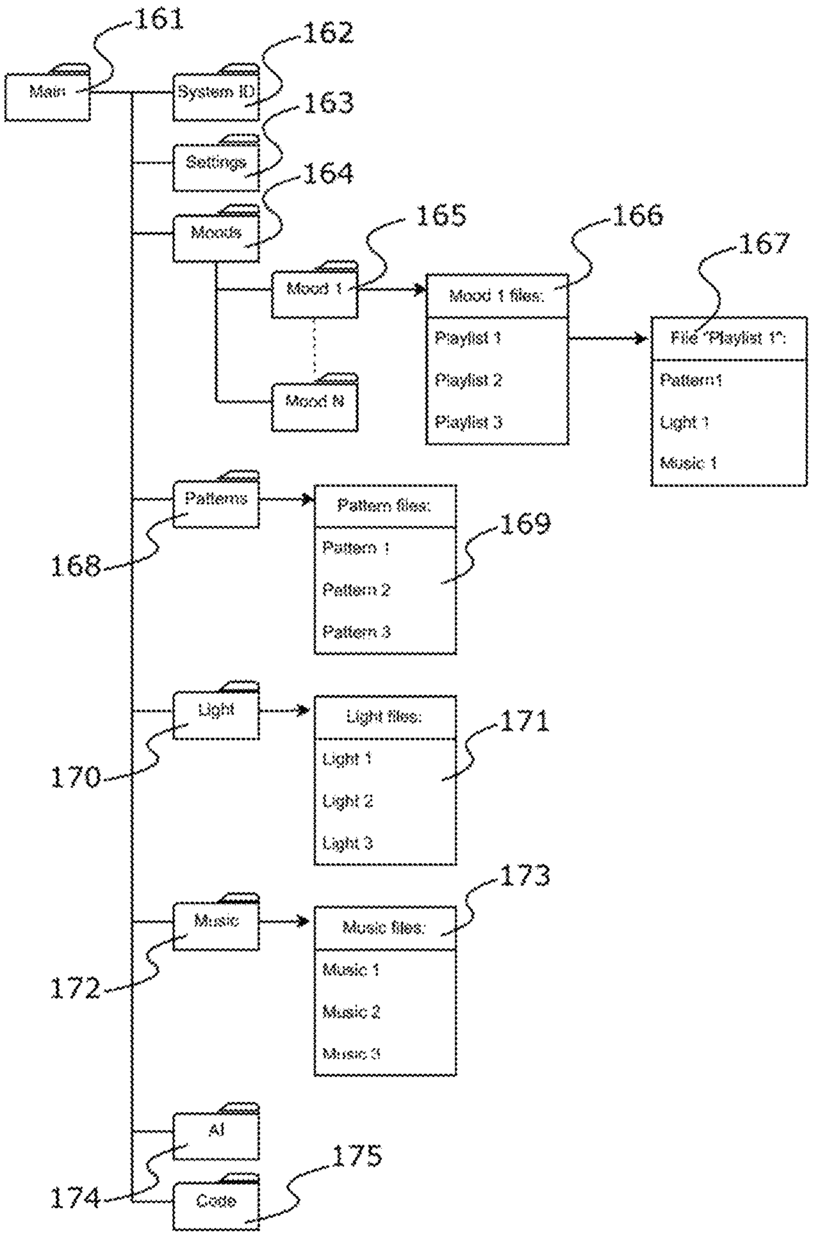
FIG. 6 shows a folder structure within a memory of the system according to some example implementations as described herein.

FIG. 6 shows a folder structure within a memory of the system according to some example implementations as described herein.

FIG. 6 shows a possible folder structure of storage 160. The main folder 161 of the storage 160 comprises the following folders:

- System ID 162: the System ID 162 comprises information about the physical system configuration (placement pattern, geometric configuration—how and where mechanical units 131 are placed) and the ID of the system (which is used for communication and identification);
- Settings 163: the Settings 163 comprises information about settings like pattern change speed, sound and light intensities. It also comprises information about an environment where the system is setup:
  - Shop—jewelry store/watch store/bookstore/clothing store
  - Museum—ancient history/modern pieces
  - House—living room/bedroom/kitchen
  - The settings 163 may also comprise cultural and religious information and age information. This information can be used to recommend or restrict to use certain mood patterns. Additionally or alternatively, the "environment" mentioned herein may be any one of the above-mentioned environments, or any other suitable environment, be it a public or private place.
- Moods 164: contains several subfolders 165, with each subfolder 165 named as certain moods, for example:
  - Mood 1: Happiness;
  - Mood 2: Tranquility;
  - Mood 3: Excitement;
  - Mood 4: Romantic; and so on.

Each mood subfolder 165 comprises a playlist with files 166 which correspond to the named mood. In this example, a playlist file 166 comprises references to a pattern, light files and sound files, located in folders Patterns 168, Light 170 and Music 172, respectively. This may allow for the relative positioning of the objects 133 and the mood pattern to be changed based on the mood detected by the AI unit described above. Resultantly, the system may reflect the mood of the person 60. This may allow for the system 100 to customize the person's 60 experience based on their present mood. Indeed, the relative positing of the objects may be altered based on the mood, wherein the relative positionings are changed in a cyclical pattern. This pattern may be part of the mood pattern mentioned herein. The music also may be related to the mood. For example, if the user 60 is in a focused mood, the music may be natural sounds such as sea waves, waterfall, or forest sounds and if the user is in a happy mood, the music may be a list of their favorite songs which have been saved to the memory/data storage 160 via a music streaming service, or via a transferred playlist. This may allow for the person 60 to have an immersed experience and amplify their present mood.

The main folder 161 may also contain folders for executable files relating to the Code 175.

The AI folder 174 may contain executable files, machine learning files for image/sound processing and recognition, mathematical processing subroutines relating to the machine learning unit mentioned herein, or any combination thereof.

An external storage may be used to store a copy of local storage 160, and/or may also be used a common database of all possible patterns, light and sound files.

Figure 7A:
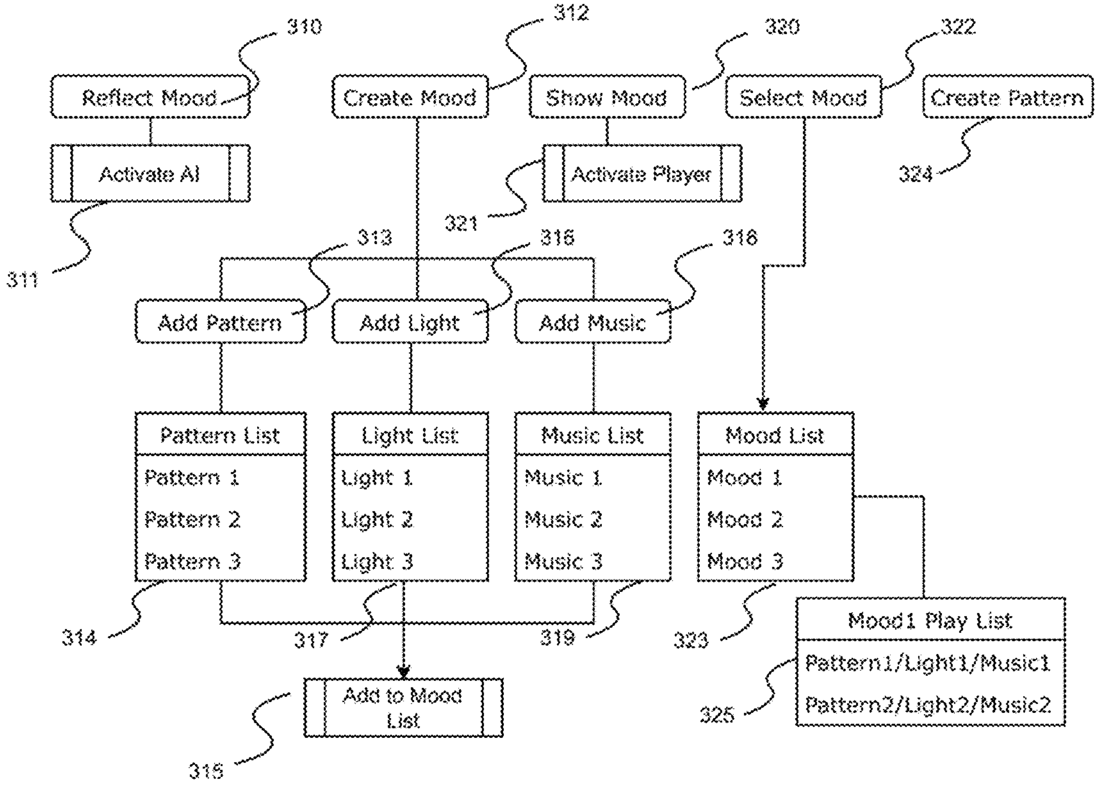
FIG. 7*a* shows a representation of an application for inputting a manual input according to some example implementations as described herein.

FIG. 7*a* shows a representation of an application for inputting a manual input according to some example implementations as described herein.

The system 100 may have a web-based application running on the mobile device 65. The user 60 can use the mobile device 65 to configure and control the system 100. When the application is activated, it shows a menu, as seen in FIG. 7*a*.

The user can select different menu options, such as:

- Reflect Mood 310: this menu item will activate machine learning algorithm 311 which will automatically determine mood, either the dominant mood in the environment, or a proportional representation of the moods in the environment, and will present one or more appropriate patterns, its/their illumination and suitable music. This may be achieved via the machine learning unit which may be configured to determine, based on the sensed parameter(s), the mood of the person. The machine learning unit may be able to do so via the sensors and/or sensors parameters mentioned herein.
- Select Mood 322 and show Mood 320: these items may control the system 100 to display a pattern, its illumination and suitable music according to a user selection. For example, the user 60 can select "Romantic Mood", then press "Show Mood" 320, and the system 100 will activate internal player 321 to go to the "Romantic Mood" folder 165, and start presenting pattern, illumination and music from the "Romantic Mood" Playlist.
- Create Mood 312: this menu item may allow the user 60 to create their own mood. The user 60 may choose appropriate items from the choices given by adding a pattern 313, a light 316 and music 318. The chosen files from the lists 314, 317, 319 may then be added 315 to the Mood List 323. The system 100 may then make this mood available for choosing in the future, as described in the Select Mood 322 section. Additionally, in order for the system 100 to recognize this new created mood, the system 100 may take account of the sensed parameter(s) at the point of creation of the mood, and store this/these parameter(s) so that when this/these parameter(s) is/are sensed again, the control unit controls the relative position of the objects 133 based on this/these parameter(s), should "Reflect Mood" 310 be chosen. The created mood then may be placed into the sub-folder 165 and comprise a playlist with files 166 as mentioned above.

Create Pattern 324: this menu item may allow the user 60 to create a new pattern, be it static or dynamic. This process will be described in more detail below.

Figure 7B:
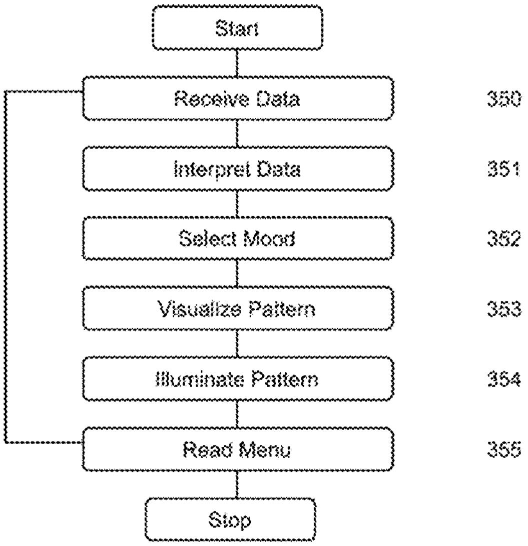
FIG. 7*b* shows a flow chart of a method according to some example implementations as described herein.

By choosing "Reflect Mood" 310 and consequently "Activate AI" 311, the method shown in FIG. 7*b*, and as described below, is executed.

Start: The beginning of the method comprises activating an audio sensor 115, sound processing hardware and sound processing software.

Receive Data 350: the audio data is received, filtered, amplified and treated in any other suitable manner and passed to next step.

Interpret Data 351: at this stage, the audio data is analyzed, and keywords and verbal expressions are extracted, and processed by the machine learning unit to determine the dominant user mood. Other audio information can be analyzed, such as sound level, talking speed and style of talking (scream, whisper, talk, sing, etc.).

Select Mood 352: based on the result of the interpretation of the audio data, a user mood is selected, and a respective playlist is activated.

Visualize Pattern 353: patterns are displayed by altering the relative positioning of at least two of the objects with respect to one another.

Illuminate Pattern 354: the patterns are illuminated.

Read Menu 355: it is checked if the user 60 has selected another menu option.

The above process may automatically continuously repeat, or repeat at set intervals such as, for example 1 minute, until another option is chosen, or the system 100 is deactivated. In some examples, not all of the above steps are undertaken. For example, there may be no "Illuminate Pattern" 354 step. In some examples, the steps are undertaken in a different order. For example, step 354 may be executed before step 353. In some examples, steps take place simultaneously.

Figure 8:
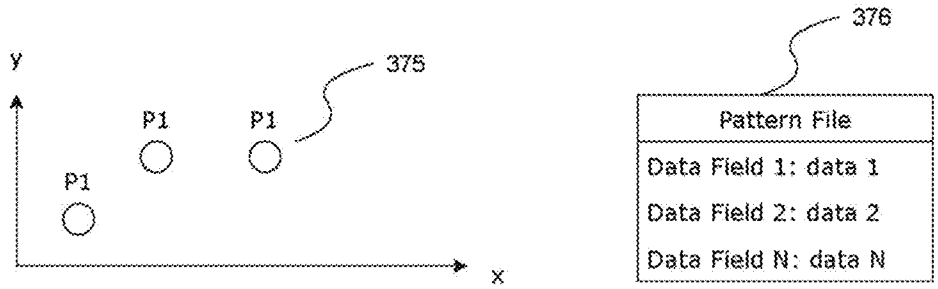
FIG. 8 shows a representation of positioning of the objects according to some example implementations as described herein.

FIG. 8 shows a representation of positioning of the objects according to some example implementations as described herein.

FIG. 8 shows a possible format to represent a pattern. In this example, the pattern comprises three point sources P1, P2, P3. The coordinates 375 of the point sources P1, P2, P3 can be used to display a pattern by the system 100, wherein each dot corresponds to an object 133. If the object 133 is an elongated object, the coordinate 375 may relate to a center point of the element, and may, additionally or alternatively, comprise a rotational angle component, so that the control unit can calculate how far the elongated object needs to be rotated in order to achieve a desired pattern. The skilled person understands that there may be any suitable number of point sources and/or elongated objects in the pattern.

An example of a simple pattern file 376 is shown. It comprises the following data fields:

| Data Field | Field name | Field description |
|---|---|---|
| 1 | Pattern Name | The unique name of the pattern |
| 2 | Description | Description of pattern |
| 3 | Associations | To which association pattern can be applied |
| 4 | Moods | To which mood pattern can be applied |
| 5 | Emotions | Associated emotion list |
| 6 | Music Style | Associated music styles |
| 7 | Shape of pattern | Shape of pattern in form of dot coordinates (x, y, z) |

Below is an example of how to use this format:

Exemplary pattern and its data fields:

Data Field Nr. 1: Pattern Name: "low amplitude 3-peak wave".

Data Field Nr. 2: Description of pattern: "a wavy line having 3 peaks, where relation between amplitude and wavelength is less than a value x. Higher value x, shorter wavelength and higher amplitude".

Data Field Nr. 3: Association: "calm sea, light breeze, lightweight clouds, travel, vacations".

Data Field Nr. 4: Moods: "relaxed, romantic".

Data Field Nr. 5: Emotions: "pleasure, tranquility"

Data Field Nr. 6: Music style: "slow romantic, instrumental"

Data Field Nr. 7 of pattern file 376 contain coordinates 375 of each point, forming a shape of a pattern. In some cases, the x-distance between dots are equal and may be omitted, so data field Nr. 7 may contain only y-coordinates.

In the case of using an automated rope winch as the mechanical unit 131, the y-coordinates may be directly transformed to rope lengths, or other suitable link 132 lengths, so that the object(s) 133 can be positioned according to the shape of pattern.

Data Fields 1 to 4 may be used by the machine learning unit at steps 351, 352 of the method shown in FIG. 7*b* in the following way: the dominant user mood may be searched within a list of pattern files, and may use data fields 3 and 4 in order to help determine the mood. Consequently, the search result is used to visualize and illuminate pattern in steps 353, 354.

The system 100 of the present application may allow for the automatic creation of dynamic patterns starting from static patterns, and vice versa. Process of creating dynamic patterns may be initiated by:

selecting the Create Pattern 324 menu item; this option may also allow created pattern to be stored in the pattern list 314; and/or by selecting the Show Mood 320 menu item; this option may create new patterns automatically when the player 321 will display and illuminate patterns from the Mood Play List 325, without saving the newly created pattern to the memory.

Figure 9:
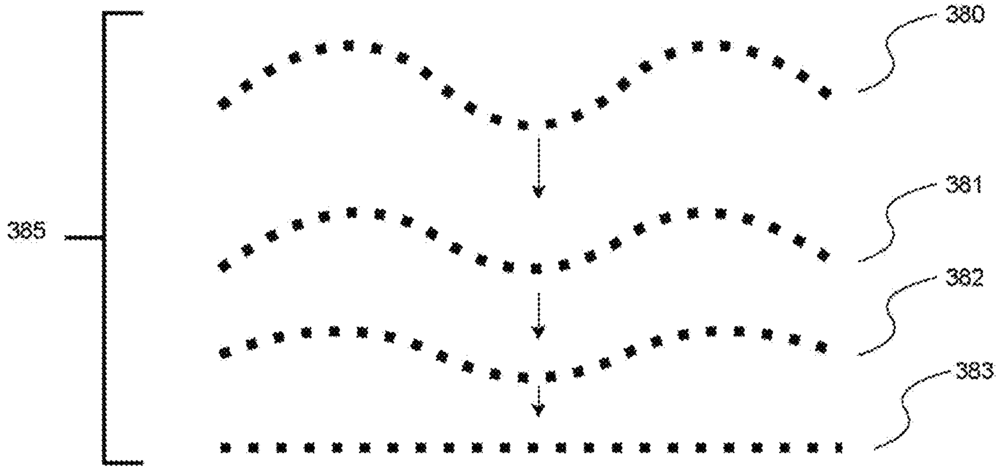
FIG. 9 shows a creation of a new mood pattern according to some example implementations as described herein.

FIG. 9 shows a creation of a new mood pattern according to some example implementations as described herein.

FIG. 9 shows the process of the creation of a new pattern. The method comprises, in this example, two patterns: a first pattern 380 which is currently being displayed and a second pattern 383, which is a desired pattern. To go from the first pattern 380 to the second 383, a physical distance difference between each dot forming the respective patterns must be calculated. Then, after the calculation, the object(s) 133 is/are moved, via the methods mentioned herein, to its/their new position(s) in order to create the second pattern 383.

During movement of the object(s) 133, new patterns will be created, for example pattern 381 and 382.

A dynamic pattern 385 will be produced during this process of object 133 movements as the object(s) 133 is/are rearranged. Such a dynamic pattern 385 may be considered as an emotional transition from a first associated emotion to a second associated emotion. The speed of such transition may be setup by user, and may depend on the pattern and its association. In some examples, the speed of the transition may be predetermined by the Data Processing and Control Unit 100*a*. In some examples, the user may select a keyword, such as "fast" or "slow" with regards to the speed of transition, and then the Data Processing and Control Unit 100*a* may select the speed of transition based on the selected keyword and the pattern and its association. For example, a short-wave pattern with a short wavelength may be transitioned to a long-wave pattern with a long wavelength or a high amplitude wave pattern may be transitioned to a low amplitude wave, or even to a straight line. In the example shown in FIG. 9, an association made by the user 60 may be a stormy sea becoming a calm sea, and so, the transition may have relaxing emotional effect and/or therapeutic effect on the user 60.

Examples of the present disclosure may be able to cause the user 60 to be subject to the so-called "change blindness phenomenon". Change blindness is a phenomenon of visual perception that occurs when a stimulus undergoes a change without this change being noticed by its observer.

Change blindness may be defined as the failure to detect when a change is made to a visual stimulus. It occurs when the local visual transient produced by a change is obscured by a larger visual transient, such as an eye blink, saccadic eye movement, screen flicker, or a cut or pan in a motion picture; or when the local visual transient produced by a change coincides with multiple local transients at other locations, such as mud-splashes, which act as distractions, causing the change to be disregarded.

The nature of change blindness results from a disconnect between the assumption that visual perceptions are so detailed as to be virtually complete, and the actual ability of the visual system to represent and compare scenes moment-to-moment.

That may mean that small changes of the pattern and/or mood pattern and/or mood line, as described herein, may not be immediately visible to the user 60. This may occur in two scenarios:

- where the user 60 is constantly looking at the pattern and/or mood pattern and/or mood line and/or system 100; and/or
- wherein the user 60 periodically looks at the pattern and/or mood pattern and/or mood line and/or system 100, and does a secondary activity between looks.

Even if the user 60 looks at the pattern and/or mood pattern and/or mood line and/or system 100 constantly, attention is needed by the user 60 to track differences between the present and previous shapes of the pattern and/or mood pattern and/or mood line and/or system 100, especially when the changes are made at very low transition speed. Thus, the change blindness effect will occur, but with less impact.

In the contrary, if the user 60 is socially active, and does something between looks at the pattern and/or mood pattern and/or mood line and/or system 100, they will miss most of the changes during the transition time. At the beginning, they will see one static pattern and/or mood pattern and/or mood line, and at a second, later moment in time, they will see another pattern and/or mood pattern and/or mood line, or even a new pattern and/or mood pattern and/or mood line, and be surprised that the changes occurred without visible movement.

Both of the above scenarios are used, and experienced, in real life. Setting up a long transition time, with a low speed of transition, between patterns and/or mood patterns and/or mood lines may make this change blindness effect stronger. Below is an example table of possible speeds of transition of objects 133 between a first position and a second position and/or a transition between a first pattern and a second pattern, wherein the objects 133 transition with the example speeds shown below, and wherein the speed corresponds to an absolute distance needed for the objects 133 to transition from their first position to their second position.

| Range of object movement, m | Speed range, mm/sec |
|---|---|
| 0-1 | 0.5-1.0 |
| 0-2 | 1.0-1.5 |
| 0-4 | 1.0-4.0 |
| 0-6 | 1.0-10 |

The skilled person understands that the bigger the movement distance of the objects 133 and the lower the speed the objects 133 move at, the greater is the change blindness effect.

The overall change blindness effect may be increased if a gradual color changing of the objects 133 is also used. This phenomenon is known as color change blindness, which is the inability to notice difference in colors between stimuli. Changes in color and/or changes in brightness of the illumination of the objects 133 in the methods described herein during transition may be also applied.

This effect may be called "Change Blindness Mode", and can be selected by user 60 and can be selected in a method similar to that described above in relation to FIG. 7*a*. This mode of operation may be connected to any "low energy" moods, such as, for example, relaxing, tranquility and sleeping.

Illumination may also be involved in such a transition. Taking the example of stormy sea, an initial pattern illumination can be a dark blue color, and the final illumination relating to a calm sea may be a light blue color. Illumination can also be changed dynamically from dark to light blue during transition. Or, alternatively, only the first 380 and second 383 patterns may be illuminated, meaning that the transition between two patterns will be dark. This may relate to a dimming of the objects during the transition, or a switching off of the light reflecting from the objects, via the light unit(s) 141 and/or the light emitting element within the object(s) 133 during transition.

In another example, the first pattern 380 may be a series of appearingly randomly placed point sources, which is associated with chaos and uncertainty. The second pattern 383 may, in turn, be a straight line, which associated with order and stability. The transition from the first pattern 380 to the second pattern 383 may lead to an emotional transition from chaos to order. In some examples, the speed of the transition may be predetermined by the Data Processing and Control Unit 100*a*. In some examples, the user may select a keyword, such as "fast" or "slow" with regards to the speed of transition, and then the Data Processing and Control Unit 100*a* may select the speed of transition based on the selected keyword and the pattern and its association. The illumination in this example may be from random colored dots to a light blue color.

The system 100 of the present application may allow for operation not only with 2D patterns, but also with 3D patterns, by using, for example, cascading Pattern and Illumination Units 100*b*, wherein each Unit 100*b* is placed at a different height. Thus, taking last example, the randomized dots can be arranged in volumetric space, and then arranged as a straight 2D plane during the transition process.

Figure 10:
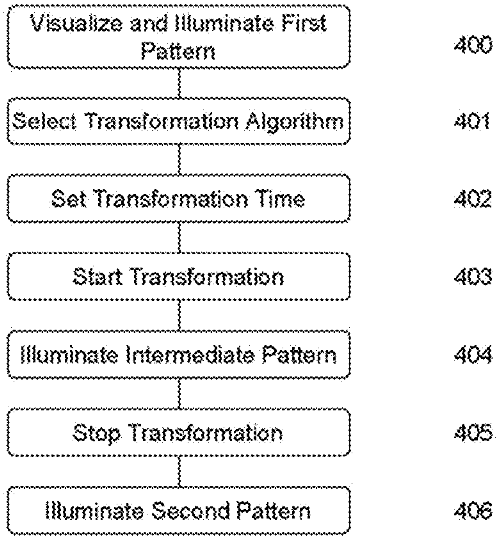
FIG. 10 shows a further method according to some example implementations as described herein.

FIG. 10 shows a further method according to some example implementations as described herein. In FIG. 10, a method of the creation of the dynamic pattern is depicted:

Step 400: Take first pattern, display and illuminate it;

Step 401: Select the Transformation Algorithm, which can be selected by the user 60 from system settings menu. The transformation algorithm may be the algorithm that allows for the first pattern 380 to become the second pattern 383;

Step 402: Set Transformation Time. This is the time it takes for the transition from the first pattern 380 to the second pattern 383. This may be predetermined by the system 100, or chosen by the user 60;

Step 403: Start Transformation—can be activated by: the user 60, or be scheduled for a predetermined time;

Step 404: Illuminate Intermediate Patterns 381, 382. The illumination may also be selected from the system setting menu;

Step 405: Stop Transformation—stop physically moving the object(s) 133 when the second pattern 383 is achieved; and Step 406: Illuminate Second Pattern 383.

In some examples, not all of the above steps are undertaken. For example, there may be no "Illuminate Intermediate Patterns" 381, 382 step 404, or any "Illuminate Pattern" step 404, 406 at all. In some examples, the steps are undertaken in a different order. For example, step 402 may be executed before step 401. In some examples, steps take place simultaneously.

Figure 11:
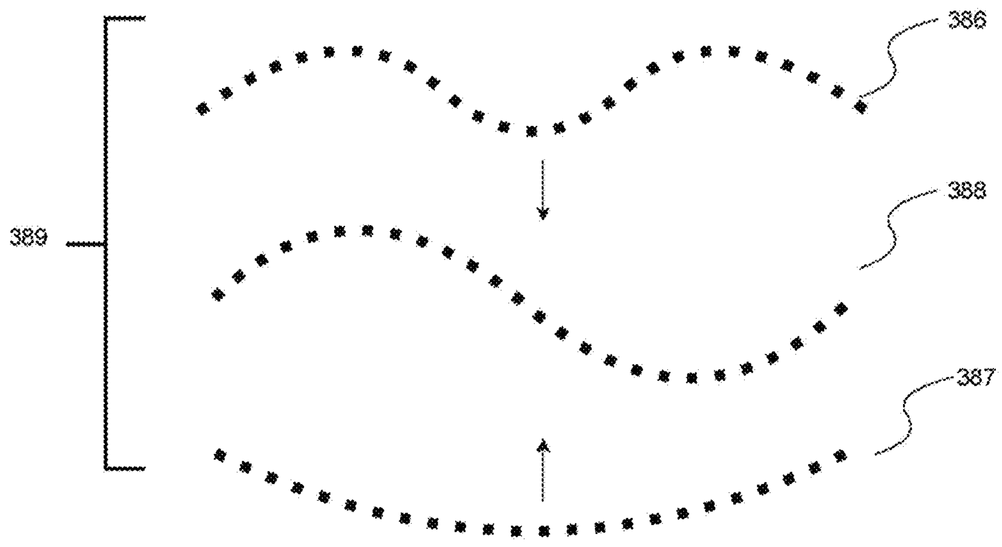
FIG. 11 shows a creation of a combined mood pattern according to some example implementations as described herein.

FIG. 11 shows a creation of a combined mood pattern according to some example implementations as described herein.

FIG. 11 shows how to create new pattern from two existing patterns.

In this example, the system 100 displays two patterns: a first pattern 386, located at top of the system 100, and a second pattern 387, located at bottom of the system 100. The skilled person understands that the patterns 386, 387 may be the other way round. The patterns 386 and 387 are represented by different sets of objects 133. In some examples, there may be a plurality of Illumination Units 100*b* in the system 100, wherein the first pattern 386 may be shown by a first Illumination Unit 100*b*, the second pattern 387 may be shown by a second Illumination Unit 100*b*, and the third pattern 388 may comprise at least one object 133 from each of the first and second Illumination Units 100*b*. During the transformation towards the third pattern 388, the first and second patterns 386, 387 move towards each other, and form the third pattern 388, which is formed by sets of objects 133 from both the first and second patterns 386, 387, and thereby, in some examples, objects 133 from the first and second Illumination Units 100*b*. The pattern formed during the transition may be a dynamic pattern 389

An algorithm of transformation for creating the third pattern 388, for example, may calculate a mean value between y-coordinates of the first and second patterns 386, 387, wherein the result of the mean value is the y-coordinate of the third pattern 388.

Figure 12:
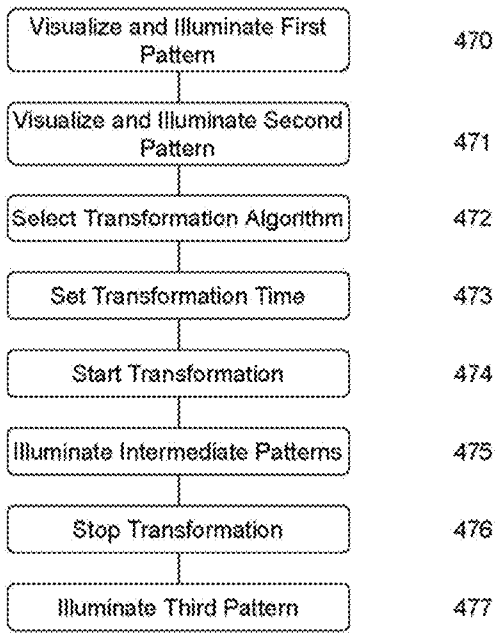
FIG. 12 shows a further method according to some example implementations as described herein.

FIG. 12 shows a further method according to some example implementations as described herein. In FIG. 12, a method of the creation of a third pattern from a first and a second pattern is depicted:

Step 470: Take the first pattern 386, display and illuminate said pattern;

Step 471: Take the second pattern 387, display and illuminate said pattern;

Step 472: Select the Transformation Algorithm which can be selected by user 60 from the system settings menu. The transformation algorithm may be the algorithm that allows for the third pattern 388 to be formed;

Step 473: Select Transformation Time. This is the time it takes for the transition from the first and second patterns 386, 387 to the third pattern 388. This may be predetermined by the system 100, or chosen by the user 60;

Step 474: Start Transformation—can be activated by: the user 60, or be scheduled for a predetermined time;

Step 475: Illuminate Intermediate Pattern—The illumination may also be selected from the system setting menu Step 476: Stop Transformation—stop physically moving the object(s) 133 when the third pattern 388 is achieved.

Step 477: Illuminate Third Pattern 388

In some examples, not all of the above steps are undertaken. For example, there may be no "Illuminate Intermediate Pattern" step 475, or any "Illuminate Pattern" step 475, 477 at all. In some examples, the steps are undertaken in a different order. For example, step 473 may be executed before step 472. In some examples, steps take place simultaneously.

A pattern file, which may be the same as the pattern file 376 described above, is created as a result of the above-described transformation. Attributes for the newly created pattern may be assigned by the user 60 corresponding to the data fields as described in relation to FIG. 8.

Figure 13A:
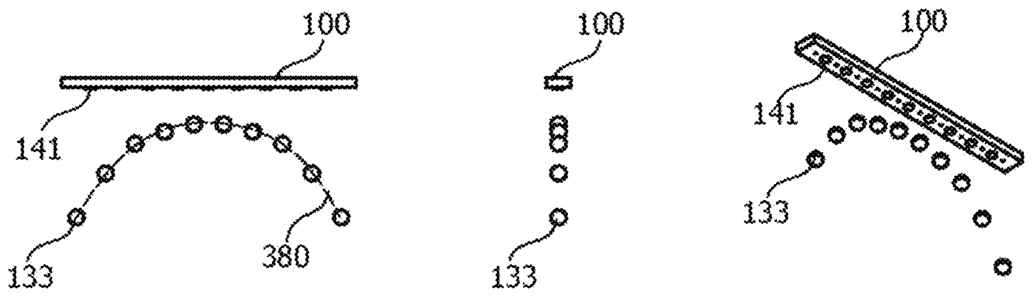
FIGS. 13*a-c* show schematic illustrations of positioning of objects according to some example implementations as described herein.
Figure 13B:
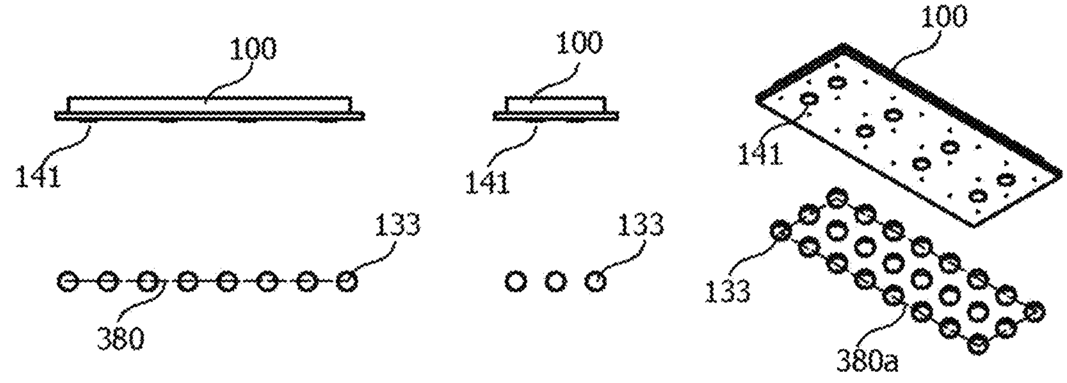
Figure 13C:
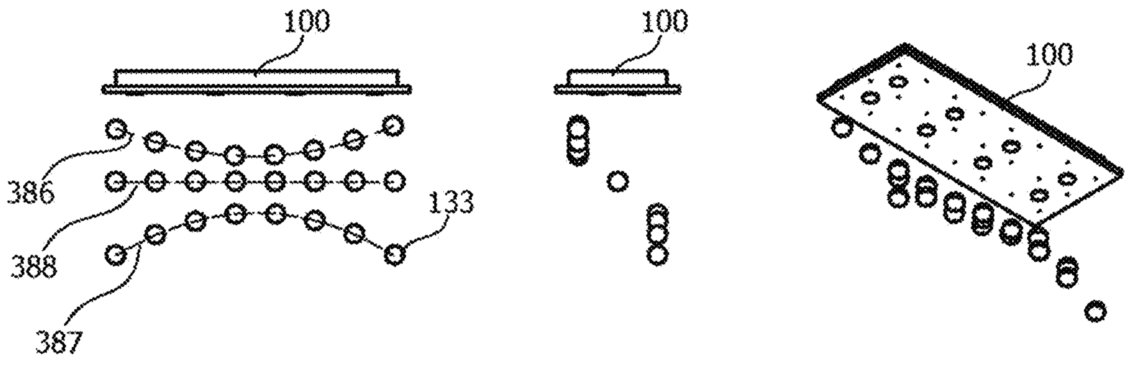

FIGS. 13*a-c* show schematic illustrations of positioning of objects according to some example implementations as described herein.

FIG. 13*a* shows a front view, a side view, and a perspective view of a simple linear system 100, having winches as mechanical units 131 inside (not shown), light units 141, and objects 133 suspended on ropes coupled to the winches (ropes are not shown for simplicity). In this example, the objects 133 form an arc pattern 380, wherein the pattern is made via the virtual connections described herein, and is shown by the dashed line.

FIG. 13*b* shows a front view, a side view, and a perspective view of a system 100, wherein the system 100 comprises three subsystems which form a 3×8 matrix. The system once again comprises winches as mechanical units 131 (not shown), light units 141, and objects 133 suspended on ropes (ropes are not shown for simplicity). The objects 133 form a pattern 380, wherein the pattern is made via the virtual connections described herein, and is shown by the dashed line, if viewed from the front, and a mood pattern/mood plane if viewed from a perspective view.

FIG. 13*c* shows a front view, a side view, and a perspective view of a system 100, similar to FIG. 13*a*, but the physical positioning of at least some of the objects 133 is altered so that two mood patterns 386 and 387 form a new pattern 388, as is described in relation to, for example, FIG. 11.

Throughout FIG. 13, although light units 141 are mentioned, the skilled person understands that, for at least some of the objects 133, light emitting elements may be within said objects 133.

FIGS. 14*a-d* show schematic illustrations of positioning of objects according to some example implementations as described herein.

Figure 14A:
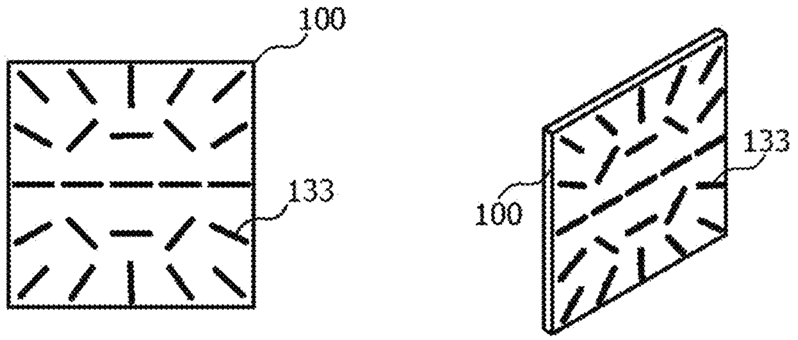
FIGS. 14*a-d* show schematic illustrations of positioning of objects according to some example implementations as described herein.

FIG. 14*a* shows a front view and a perspective view of a system 100, where elongated objects 133 are driven by rotators or servo motors (not shown). Thus, the objects 133 can rotate around their centers and form different patterns.

Figure 14B:
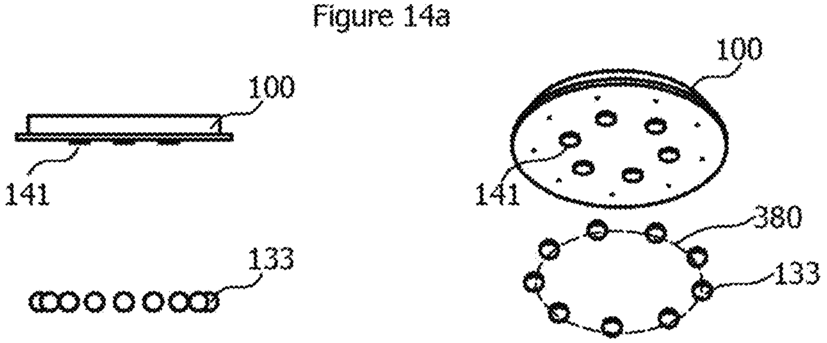

FIG. 14*b* shows a front view and a perspective view of a system 100, wherein mechanical units 131 (winches, not shown) are placed in circular pattern. Thus, the suspended objects 133 form a circular pattern 380.

Figure 14C:
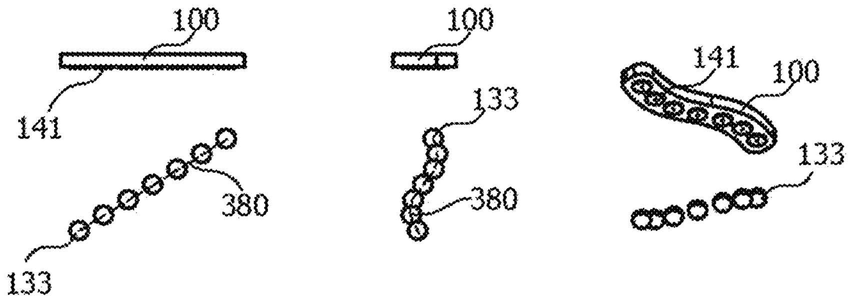

FIG. 14*c* shows a front view, a side view, and a perspective view of a system 100, wherein the mechanical units 131 (winches, not shown) are arranged in the form of a curved line.

Figure 14D:
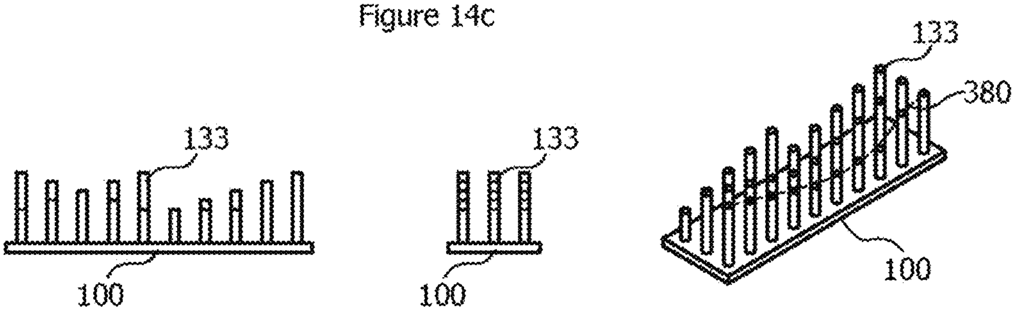

FIG. 14*d* shows a front view, a side view, and a perspective view of a system 100, wherein the mechanical units 131 are linear actuators with objects 133 attached to their ends. In this example, the mood pattern may be formed by extending and retracting the linear actuators. Although the system 100 of FIG. 14*d* is shown as if it is positioned on the ground, the skilled person understands that the system may be placed on a wall, a ceiling, or any other suitable surface.

FIGS. 15*a-f* show illustrations of the positioning of objects according to some example implementations as described herein.

Figure 15A:
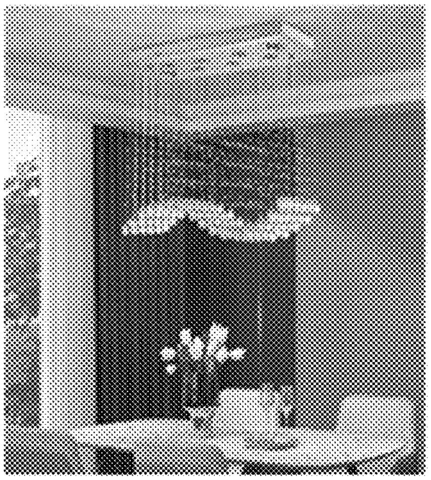
FIGS. 15*a-f* show illustrations of the positioning of objects according to some example implementations as described herein.
Figure 15B:
Figure 15C:
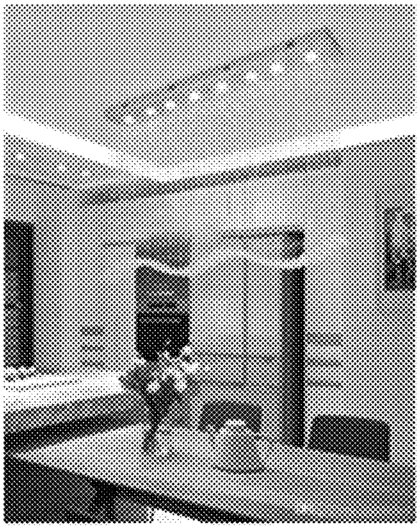
Figure 15D:
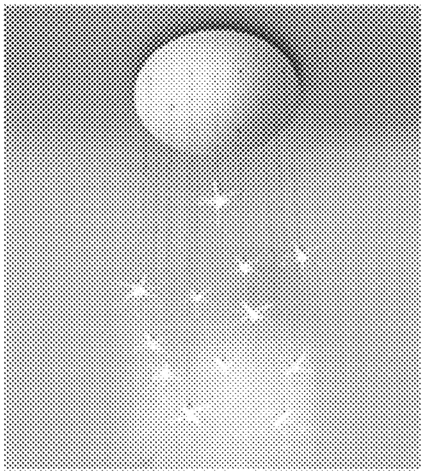
Figure 15E:

FIGS. 15*a-f* show various real-world examples of the system 100 described herein. In particular:

FIGS. 15*a, b, c* and *e* show systems 100 generally as described herein according to some example implementations, wherein the objects 133 are in a wave-like pattern;

FIG. 15*d* shows a system 100 generally as described herein according to some example implementations, wherein the objects 133 are located at different heights with respect to the user 60 viewing the system 100 and/or different heights with respect to the mechanical unit(s) 131.

Figure 15F:
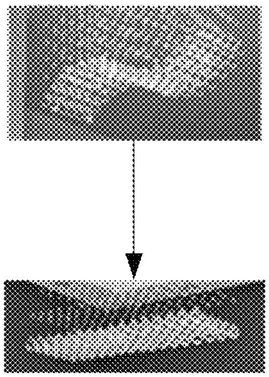
Figure 15A:
Figure 15B:
Figure 15C:
Figure 15D:
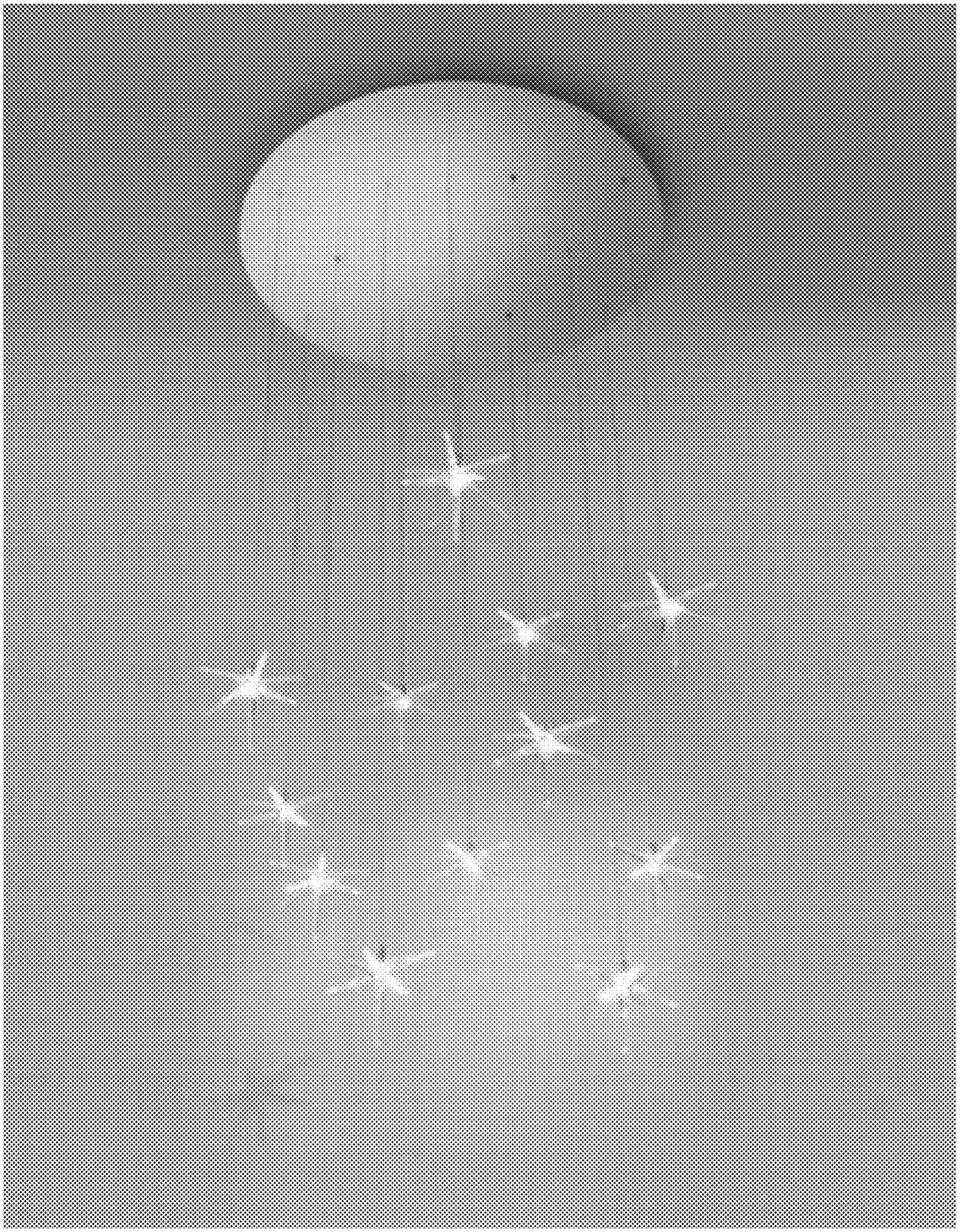
Figure 15E:
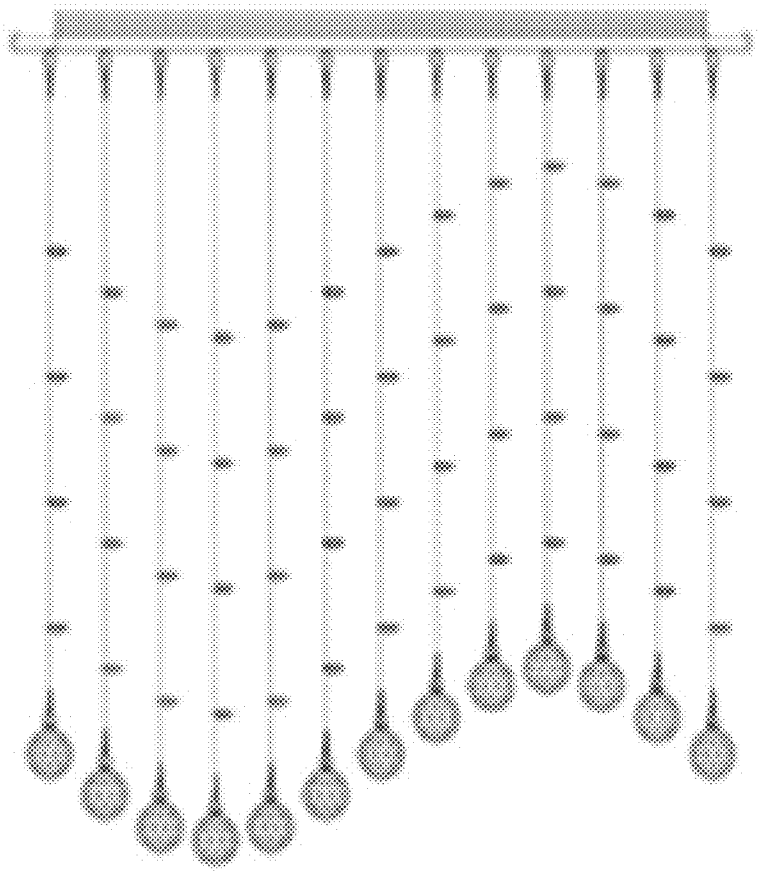
Figure 15F:
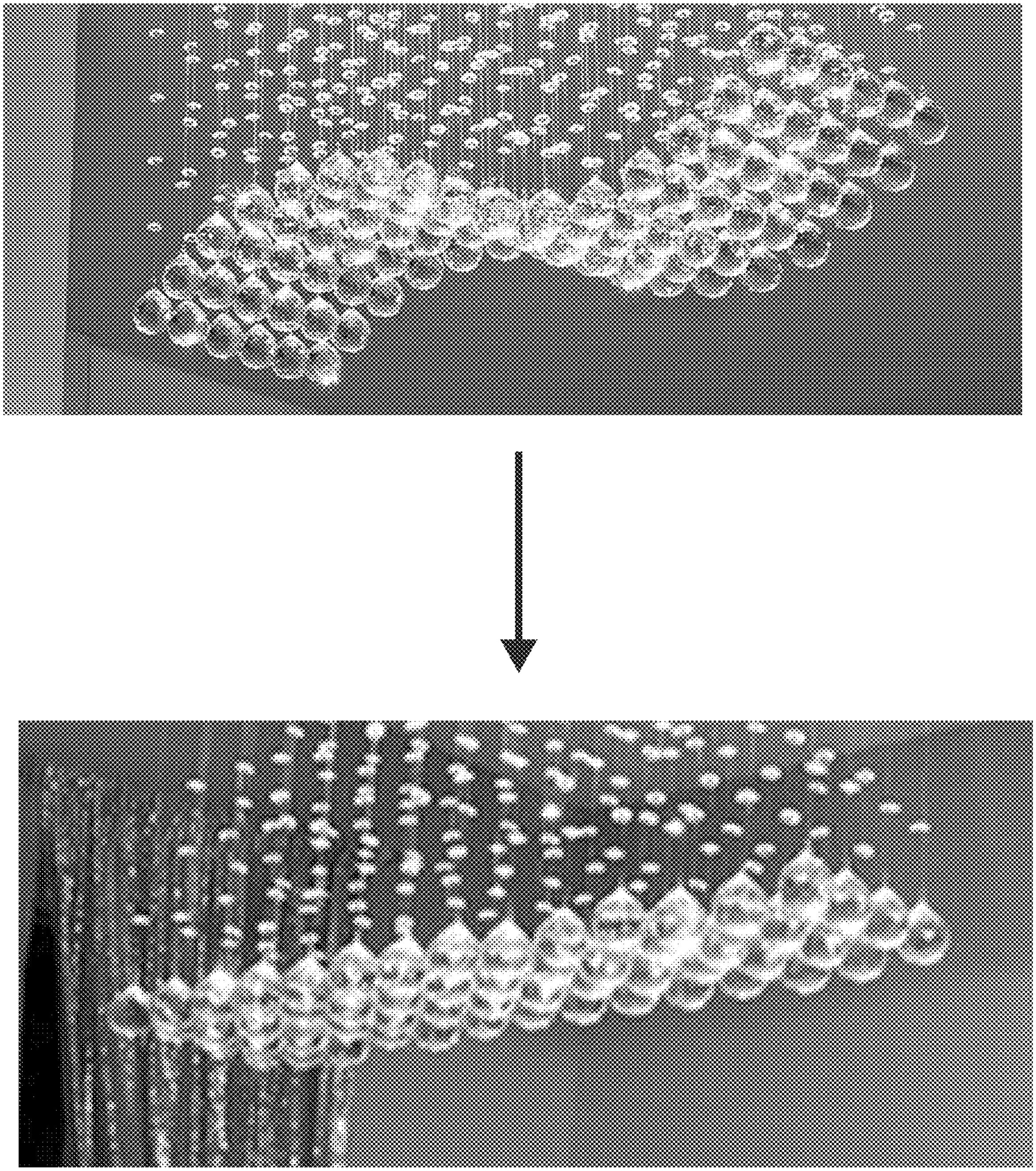

FIG. 15*f* shows a system 100 generally as described herein according to some example implementations, wherein the objects 133 are in transition, as described with relation to, for example, FIGS. 9 to 12. Here the objects 133 are positioned in the first pattern, and are then moved to different physical positions to form the second pattern.

It will be appreciated that the present disclosure has been described with reference to exemplary embodiments that may be varied in many aspects. As such, the present invention is only limited by the claims that follow.

The invention claimed is:

1. A system, comprising:

a control unit;

a pattern visualization device; and a sensor couplable to the control unit, wherein the sensor is configured to sense a parameter of an environment surrounding at least two objects and to provide the sensed parameter to the control unit, wherein the sensed parameter relates to one or more of:

a presence and/or movement of a person within the environment surrounding at least one of the at least two objects;

a pose and/or gesture of the person in the environment surrounding at least one of the at least two objects; and a sound in the environment surrounding at least one of the at least two objects, wherein the control unit is couplable to the at least two objects and to the pattern visualization device, wherein the control unit is configured to control, based on the sensed parameter, a relative positioning of at least a first one of the at least two objects with respect to at least a second one of the at least two objects, and wherein the pattern visualization device comprises means for moving at least one of the objects based on the controlling of the relative positioning by the control unit.

2. The system of claim 1, wherein the sound in the environment is a vocal expression of the person in the environment surrounding at least one of the at least two objects and/or a genre of music in the environment surrounding at least one of the at least two objects.

3. The system of claim 1, wherein the sensed parameter relates to one or more of:

an ambient light level in the environment surrounding at least one of the at least two objects; and a facial expression of the person in the environment surrounding the at least one of the at least two objects.

4. The system of claim 1, further comprising a pattern illumination device comprising a light source, wherein at least one of the at least two objects is illuminatable by the light source.

5. The system of claim 1, wherein at least one of the at least two objects comprises a light emitting element configured to emit light.

6. The system of claim 1, wherein at least one of the at least two objects is moveable, upon a controlling of at least one of the at least two objects by the control unit, by a winch and/or a linear actuator and/or a servo actuator and/or a rotating means.

7. The system of claim 1, wherein a geometry defined by respective locations of the at least two objects represents a mood pattern, wherein the mood pattern corresponds to an emotion of a person within the environment surrounding at least one of the at least two objects, and wherein the control unit is configured to control the relative positioning to generate the mood pattern based on the emotion of the person.

8. The system as claimed in claim 7, further comprising a memory configured to store a correspondence table between the emotion of the person and the geometry, wherein the control unit is configured to receive a first signal based on the correspondence table for controlling the relative positioning.

9. The system as claimed in claim 7, further comprising a processor coupled to or integral to the control unit, wherein the processor is configured to determine the emotion of the person based on the sensed parameter.

10. The system of claim 7, wherein the geometry defining the mood pattern fulfils at one or more discrete points in time one or more of:

a straight line according to a first emotion;

a wave-like line according to a second emotion;

a zig-zag pattern according to a third emotion;

a spiral according to a fourth emotion;

a round shape according to a fifth emotion;

a rectangle shape according to a sixth emotion;

a star-like line according to a seventh emotion; and a rhombus shape according to an eighth emotion.

11. The system of claim 1, further comprising a remote control device configured to receive a first manual input by a person regarding an emotion of the person, wherein the remote control device is configured to transmit a second signal to the system, and wherein the control unit is configured to control the relative positioning based on the second signal.

12. The system of claim 11, wherein the remote control device is configured to receive a second manual input by the person, wherein the second manual input relates to a creation of an emotion of the person not stored in a memory of the system, and wherein the remote control device is configured to transmit a third signal to a receiver of the system, wherein the control unit is further configured to control, based on the third signal, the relative positioning of at least the first one of the objects with respect to at least the second one of the objects, and wherein the memory of the system is configured to store the created emotion and relate said created emotion to the sensed parameter.

13. The system of claim 12, wherein the remote control device is configured to receive a third manual input by the person, wherein the third manual input relates to the relative positioning of at least the first one of the objects with respect to at least the second one of the objects not stored in the memory of the system, and wherein the remote control device is configured to transmit a fourth signal to the receiver of the system, wherein the control unit is further configured to control, based on the fourth signal, the relative positioning of at least the first one of the objects with respect to at least the second one of the objects, and wherein the memory of the system is configured to store the relative positioning and relate said relative positioning to the sensed parameter.

14. The system of claim 7, wherein the control unit comprises a machine learning unit comprising a machine learning algorithm, and wherein the machine learning algorithm is configured to determine, based on the sensed parameter, the emotion of the person.

15. The system of claim 14, wherein the machine learning algorithm is configured to receive updates from an external source via a wired and/or wireless source, and wherein the machine learning algorithm is configured to be altered based on an approval or disapproval by the person of the determination of the emotion of the person.

16. The system of claim 1, wherein a memory of the system comprises a first folder relating to the environment surrounding at least one of the at least two objects, wherein the first folder comprises information on one or more of:

a physical positioning of at least one of the objects;

historical information on the relative positioning of at least the first one of the objects with respect to at least the second one of the objects;

a purpose of the environment surrounding at least one of the at least two objects;

information on a person in the environment surrounding at least one of the at least two objects; and an emotion of the person in the environment surrounding at least one of the at least two objects.

17. The system of claim 16, wherein, if the first folder comprises information on the emotion of the person, the first folder comprises a subfolder comprising a playlist relating to the emotion, wherein the playlist comprises (i) a pattern of at least a first and a second relative positioning of at least the first one of the objects with respect to at least the second one of the objects, wherein the first and second relative positionings are different relative positionings, and (ii) music playable from a speaker couplable to the system.

18. The system of claim 1, wherein the control unit is further configured to control one or more of:

a wavelength of light emittable by at least one of the at least two objects;

an intensity of at least one of the at least two objects;

a first pattern comprising at least a first and a second relative positioning of at least the first one of the objects with respect to at least the second one of the objects, wherein the first and second relative positionings are different relative positionings;

a second pattern comprising at least a first and a second wavelength of light emittable by at least one of the at least two objects wherein the first and second wavelengths are different wavelengths; and a third pattern comprising at least a first and a second intensity of at least one of the at least two objects, wherein the first and second intensities are different intensities.

19. The system of claim 18, wherein, if the control unit is further configured to control the first pattern, a memory of the system comprises a second folder, the second folder comprising information on one or more of:

a name relating to the first pattern;

a description of the first pattern;

an association made, by a person, between an experience by the person and the first pattern;

an emotion associated with the first pattern;

a musical genre associated with the first pattern; and coordinates of at least a first position and a second position in which at least one of the objects is moved during the first pattern.

20. A method performed by a system for controlling a relative positioning of at least a first object with respect to at least a second object, the method comprising:

receiving, by a receiver of the system, an optical data parameter and/or a sound data parameter relating to an environment surrounding at least one of the objects;

determining, by a machine learning unit coupled to the receiver, an emotion of a person within the environment, surrounding a light source based on received optical data parameter and/or sound data parameter; and based on the determined emotion, controlling, by a control unit of the system, the control unit being couplable to (i) the machine learning unit and (ii) at least one of the objects, the relative positioning of at least the first one of the objects with respect to at least the second one of the objects.

21. A method for controlling a plurality of objects, the method comprising:

providing a single machine learning unit which is coupled to each of the objects, wherein the machine learning unit is configured to determine an emotion of an environment surrounding at least one of the objects based on the optical data parameter and/or the sound data parameter relating to the environment surrounding at least one of the objects; and performing the method of claim 20 for each of the objects.

22. The method of claim 20, wherein, if an optical data parameter is used, the optical data parameter comprises a facial expression of the person within the environment.

23. A method performed by a system for controlling a pattern comprising at least a first object and a second object, wherein the first object is coupled to a first subsystem and the second object is coupled to a second subsystem, the method comprising:

moving, via a control unit coupled to the first subsystem and the first object, the first object to a first physical position;

moving, via the control unit coupled to the second subsystem and the second object, the second object to a second physical position;

selecting, by the control unit, a transformation algorithm, wherein the transformation algorithm results in a third physical position of the first object and a fourth physical position of the second object, wherein the algorithm is generated from the first and second physical positions of the respective objects;

starting, by the control unit, the transformation; and stopping, by the control unit, the transformation when the physical position of the first object matches the third physical position and the physical position of the second object matches the fourth physical position.

24. The method as claimed in claim 23, wherein the control unit is further configured to select a transformation time, wherein the transformation time is the time needed for the first object to be controlled between the first physical position and the third physical position, and the second object to be controlled between the second physical position and the fourth physical position.

25. A method for controlling a plurality of objects, the method comprising:

providing a single control unit which is coupled to each of the objects, wherein the control unit is configured to control a positioning of at least a first object; and performing the method of claim 23 for each of the objects.

* * * * *